US008721440B2

(12) United States Patent
Ward et al.

(10) Patent No.: US 8,721,440 B2

(45) Date of Patent: May 13, 2014

(54) INTELLIGENT IMAGE RESIZING FOR WAGERING GAME MACHINES

(75) Inventors: Matthew J. Ward, Northbrook, IL (US); David Michael Pryor, Westmont, IL (US); John Lee Griffin, Chicago, IL (US)

(73) Assignee: WMS Gaming Inc., Waukegan, IL (US)

(*) Notice: Subject to any disclaimer, the term of this patent is extended or adjusted under 35 U.S.C. 154(b) by 603 days.

(21) Appl. No.: 12/863,880

(22) PCT Filed: Jan. 21, 2009

(86) PCT No.: PCT/US2009/000360

§ 371 (c)(1), (2), (4) Date: Jul. 21, 2010

(87) PCT Pub. No.: WO2009/094140

PCT Pub. Date: Jul. 30, 2009

(65) Prior Publication Data

US 2010/0292002 A1 Nov. 18, 2010

Related U.S. Application Data

(60) Provisional application No. 61/011,913, filed on Jan. 21, 2008.

(51) Int. Cl.

*A63F 9/24* (2006.01)

*G06K 9/60* (2006.01)

(52) U.S. Cl.

USPC ................. 463/33; 463/16; 463/34; 382/302; 382/304

(58) Field of Classification Search

USPC .......... 463/16, 30–34, 43; 345/619, 660, 642, 345/672; 715/788, 798, 800, 815; 382/298, 382/299, 302, 304

See application file for complete search history.

(56) References Cited

U.S. PATENT DOCUMENTS

| | | | | |
|---|---|---|---|---|
| 2002/0052235 | A1 | 5/2002 | Hirsch et al. | |
| 2003/0032479 | A1* | 2/2003 | LeMay et al. | 463/32 |
| 2004/0033827 | A1* | 2/2004 | Gilmore et al. | 463/20 |
| 2004/0121838 | A1 | 6/2004 | Hughs-Baird et al. | |
| 2005/0026670 | A1* | 2/2005 | Lardie | 463/16 |
| 2006/0178199 | A1* | 8/2006 | Thomas | 463/20 |
| 2007/0287541 | A1* | 12/2007 | George et al. | 463/37 |
| 2008/0095470 | A1* | 4/2008 | Chao et al. | 382/298 |

OTHER PUBLICATIONS

International Application Serial No. PCT/US2009/000360, Search Report mailed Mar. 10 2009, 4 pgs.

International Application Serial No. PCT/US2009/000360, Written Opinion mailed Mar. 10, 2009, 6 pgs.

Avidan, Shai, et al., "Seam Carving for Content-Aware Image Resizing", International Conference on Computer Graphics and Interactive Techniques, (Aug. 2007), 12 pgs.

* cited by examiner

*Primary Examiner* — Damon Pierce

(74) *Attorney, Agent, or Firm* — Nixon Peabody LLP

(57) ABSTRACT

Systems and methods resize images for a wagering game. The images are resized by analyzing the content of the image, and removing or adding data from/to the image in accordance with the content analysis. The content analysis may include determining an energy level, where portions of the image having a low energy level are adjusted, and portions having a higher energy level are not adjusted, or adjusted less.

18 Claims, 18 Drawing Sheets

INTELLIGENT IMAGE RESIZING FOR WAGERING GAME MACHINES

RELATED APPLICATIONS

This patent application is a U.S. National Stage Filing under 35 U.S.C. 371 from International Patent Application Serial No. PCT/US2009/000360, filed Jan. 21, 2009, and published on Jul. 30, 2009, as WO 2009/094140 A1, which claims the priority benefit of U.S. Provisional Patent Application Ser. No. 61/011,913 filed Jan. 21, 2008 and entitled "INTELLIGENT IMAGE RESIZING FOR WAGERING GAME MACHINES", the contents of which are incorporated herein by reference in their entirety.

FIELD

The embodiments relate generally to wagering game machines and more particularly to resizing graphical images for wagering games presented on wagering game machines.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever. Copyright© 2008 WMS Gaming Inc. All Rights Reserved.

BACKGROUND

Wagering game machine makers continually provide new and entertaining games. One way of increasing entertainment value associated with casino-style wagering games (e.g., video slots, video poker, video black jack, and the like) includes offering a variety of base games and bonus events. However, despite the variety of base games and bonus events, players often lose interest in repetitive wagering game content. In order to maintain player interest, wagering game machine makers frequently update wagering game content with new game themes, game settings, bonus events, game software, and other electronic data. Further, entertainment value may be increased by providing an enhanced visual game play experience. Additionally, wagering games may be presented on a variety of differing wagering game platforms, each having different display characteristics.

DETAILED DESCRIPTION

Figure 1:
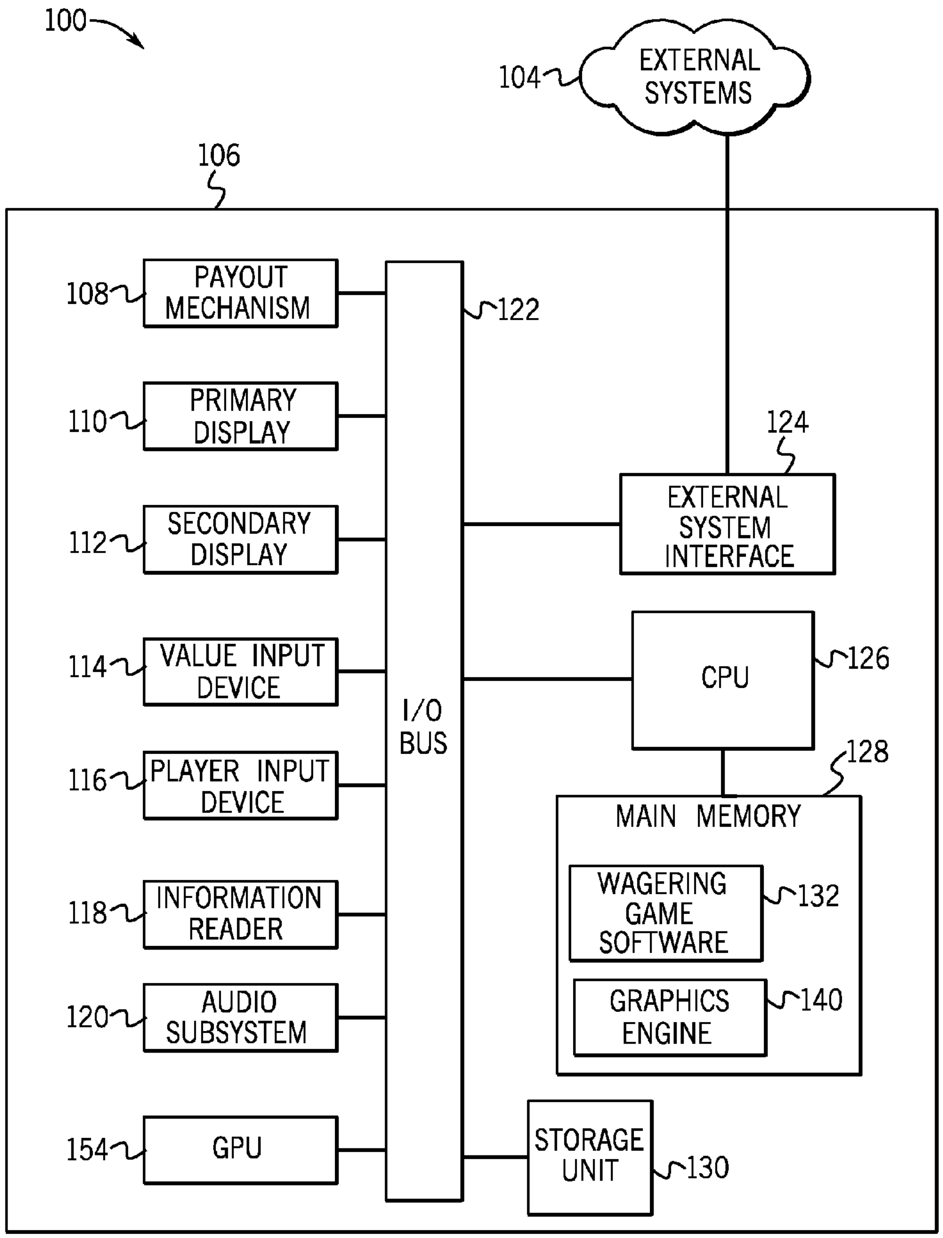
FIG. 1 is a block diagram of an architecture, including a control system, for a wagering game machine according to an example embodiment.

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component which appears in multiple Figures. Signals and connections may be referred to by the same reference number or label, and the actual meaning will be clear from its use in the context of the description.

In general, the system and method embodiments described below provide for the presentation of a wagering game on a wagering game machine where various images and portions of images may be resized in an intelligent manner by analyzing the content of the image to determine how to resize the image.

The description of the various embodiments is to be construed as exemplary only and does not describe every possible instance of the invention. Numerous alternatives could be implemented, using combinations of current or future technologies, which would still fall within the scope of the claims. The following detailed description is, therefore, not to be taken in a limiting sense, and the scope of the present invention is defined only by the appended claims.

FIG. 1 is a block diagram illustrating a wagering game machine architecture 100, including a control system, according to example embodiments of the invention. As shown in FIG. 1, the wagering game machine 106 includes a central processing unit (processor) 126 connected to main memory 128, which may store wagering game software 132. In one embodiment, the wagering game software can include software associated with presenting wagering games, such as video poker, video black jack, video slots, video lottery, etc., in whole or part. In addition, wagering game software 132 may include bonus rounds, themes, advertising content, attract mode content, pay tables, denomination tables, audio files, video files, operating system files and other software associated with a wagering game or the operation of a wagering game machine.

The processor 126 is also connected to an input/output (I/O) bus 122, which facilitates communication between the wagering game machine's components. The I/O bus 122 may be connected to a payout mechanism 108, graphics processing unit 154, primary display 110, secondary display 112, value input device 114, player input device 116, information reader 118, and/or storage unit 130. The player input device 116 can include the value input device 114 to the extent the player input device 116 is used to place wagers. The I/O bus 122 may also be connected to an external system interface 124, which is connected to external systems 104 (e.g., wagering game networks).

In general, graphics processing unit 154 processes three-dimensional graphics data and may be included as part of primary display 110 and/or secondary display 112. Graphics processing unit 154 includes components that may be used to provide a real-time three-dimensional rendering of a three-dimensional space based on input data. Graphics processing unit 154 may be implemented in software, hardware, or a combination of software and hardware.

In some embodiments, graphics processing unit 154 provides a set of one or more components that provide real-time three dimensional computer graphics for a wagering game application or other software running on a wagering game machine. Graphics processing unit 154 may also be referred to as a game engine. In some embodiments, graphics processing unit 154 provides an underlying set of technologies in an operating system independent manner such that a wagering game may be easily adapted to run on multiple platforms, including various hardware platforms such as stand-alone and portable wagering game machines and various software platforms such as Linux, UNIX, Mac OS X and Microsoft Windows families of operating systems. In some embodiments, graphics processing unit 154 may include various combinations of one or more components such as a rendering engine ("renderer") for two dimensional or three dimensional graphics, a physics engine and/or components providing collision detection, sound, scripting, animation, artificial intelligence, networking, and scene graphs. A scene graph is generally considered to be an object-oriented representation of a three dimensional game world and is designed for efficient rendering of vast virtual worlds. Thus in various embodiments, a real-time rendering of a three-dimensional model such as a scene graph is provided for a wagering game application or other software operating on a wagering game machine.

The components described above may be implemented in various combinations of software, hardware and/or firmware. Further, while shown as part of a control system 100 for a wagering game machine, graphics processing unit 154 or portions thereof may reside on systems external to the wagering game machine, such as on a game server.

In some embodiments, the components of graphics processing unit 154 may be replaced or extended with more specialized components. For example, in particular embodiments, graphics processing unit 154 may be provided as a series of loosely connected components that can be selectively combined to create a custom graphics engine for a wagering game application.

As noted above, various components may be present or associated with a graphics processing unit 154. For example, a graphics engine 140 may be provided for use with graphics processing unit 154. Various graphics engines are known in the art and may be used in various embodiments of the invention. In some embodiments, the graphics engine comprises a RenderWare graphics engine, available from Criterion Software. Some graphics engines 140 provide real-time 3D rendering capabilities while other components outside of the graphics engine provide other functionality used by wagering games. These types of graphics engines 140 may be referred to as a "rendering engine," or "3D engine".

In some embodiments, the graphics processing unit 154 and/or graphics engine 140 may utilize and be designed substantially in accordance with various versions of a graphics API such as Direct3D or OpenGL which provides a software abstraction of a graphics processing unit or video card. Further, in some embodiments, low-level libraries such as DirectX, SDL (Simple DirectMedia Layer), and OpenAL may also be used in presenting a wagering game in order to assist in providing hardware-independent access to other computer hardware such as input devices (mouse, keyboard, and joystick), network cards, and sound cards.

Figure 3:
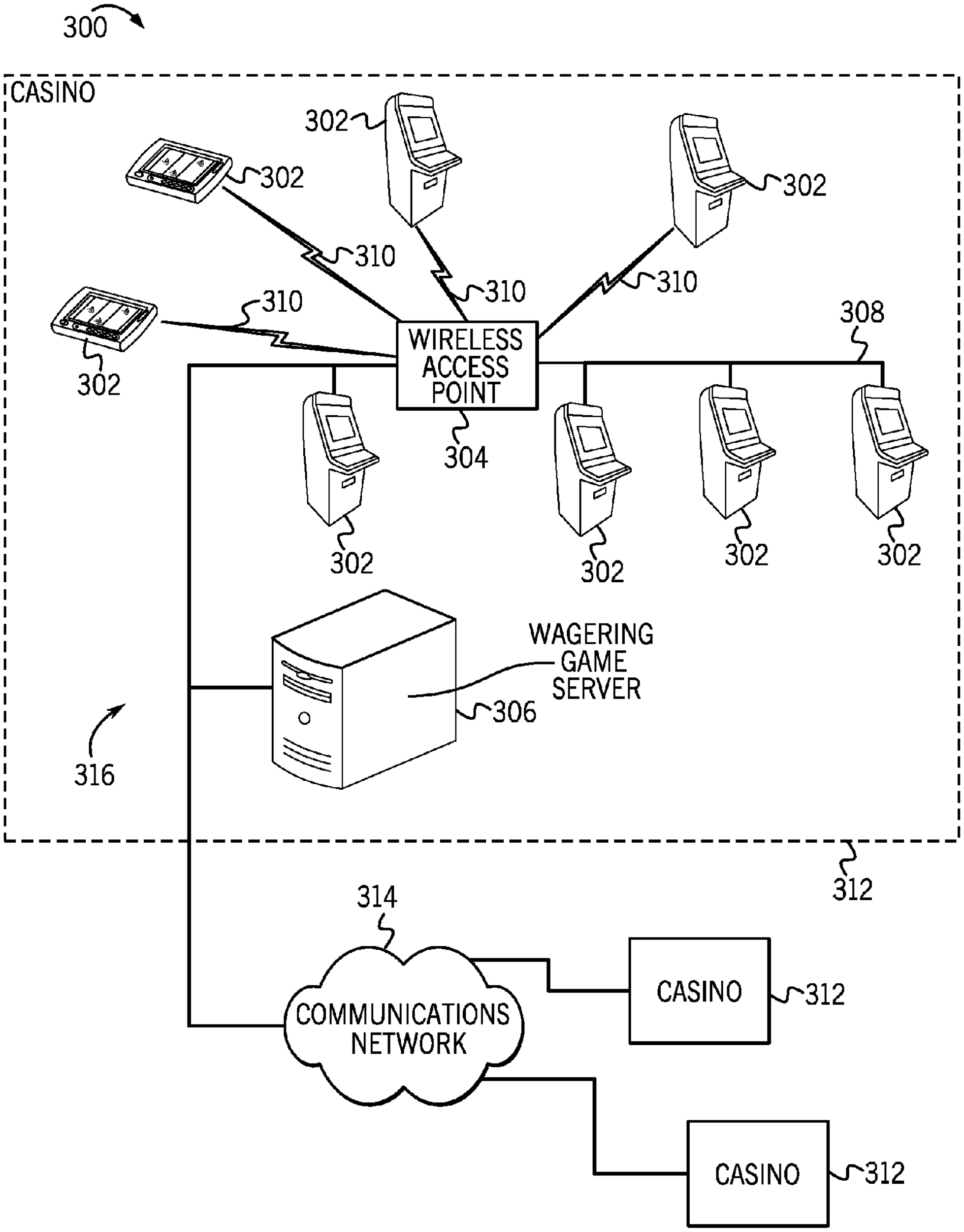
FIG. 3 is a block diagram of a networked system of wagering game machines and servers according to example embodiments.

Wagering game software 132 may be loaded from storage unit 130, or it may be loaded from external systems 104 such as servers of other systems on a wagering game network (as illustrated in FIG. 3). In general, wagering game software 132 comprises modules or units that operate to present one or more wagering game upon which monetary value may be wagered. During the course of presenting the wagering games, images composed of graphical objects are displayed on primary display 110 and/or secondary display 112. The graphical objects may represent various wagering game elements such as reels, cards, dice, symbols, animations, etc., and may also represent elements of a bonus round or other ancillary wagering game software component. The graphical objects may be combined in various manners to create images and sub-images. The images and sub-images may be resized as described below in response to the execution environment and in response to events occurring during a wagering game.

Some embodiments of the invention include an audio subsystem 120. Audio subsystem 120 provides audio capabilities to the wagering game machine and may comprise an audio amplifier coupled to speakers or an audio jack, and may further include an audio programming source on a memory such as a CD, DVD, flash memory etc.

In one embodiment, the wagering game machine 106 can include additional peripheral devices and/or more than one of each component shown in FIG. 1. For example, the peripherals may include a bill validator, a printer, a coin hopper, a button panel, or any of the many peripherals now found in wagering game machines or developed in the future. Further, in some embodiments, the wagering game machine 106 can include multiple external system interfaces 124 and multiple processors 126. In one embodiment, any of the components can be integrated or subdivided. Additionally, in one embodiment, the components of the wagering game machine 106 can be interconnected according to any suitable interconnection architecture (e.g., directly connected, hypercube, etc.).

In one embodiment, any of the components of the wagering game machine architecture 100 (e.g., the wagering game presentation unit 132 or portable wagering game management unit) can include hardware, firmware, and/or software for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

In operation, a player may use the portable wagering game machine to activate a play of a wagering game on the machine. Using the available input mechanisms such as value input device 114 or devices coupled through player input device 116, the player may select any variables associated with the wagering game and place his/her wager to purchase a play of the game. In a play of the game, the processor 126 generates at least one random event using a random number generator (RNG) and provides an award to the player for a winning outcome of the random event. Alternatively, the random event may be generated by a remote computer using an RNG or pooling schema and then transmitted to the wagering game machine. The processor 126 operates the displays 110 and 112 to represent the random event(s) and outcome(s) in a visual form that can be understood by the player. In some embodiments, a wagering game segment may be triggered based on certain events. For example, a bonus round may be triggered.

Figure 2:
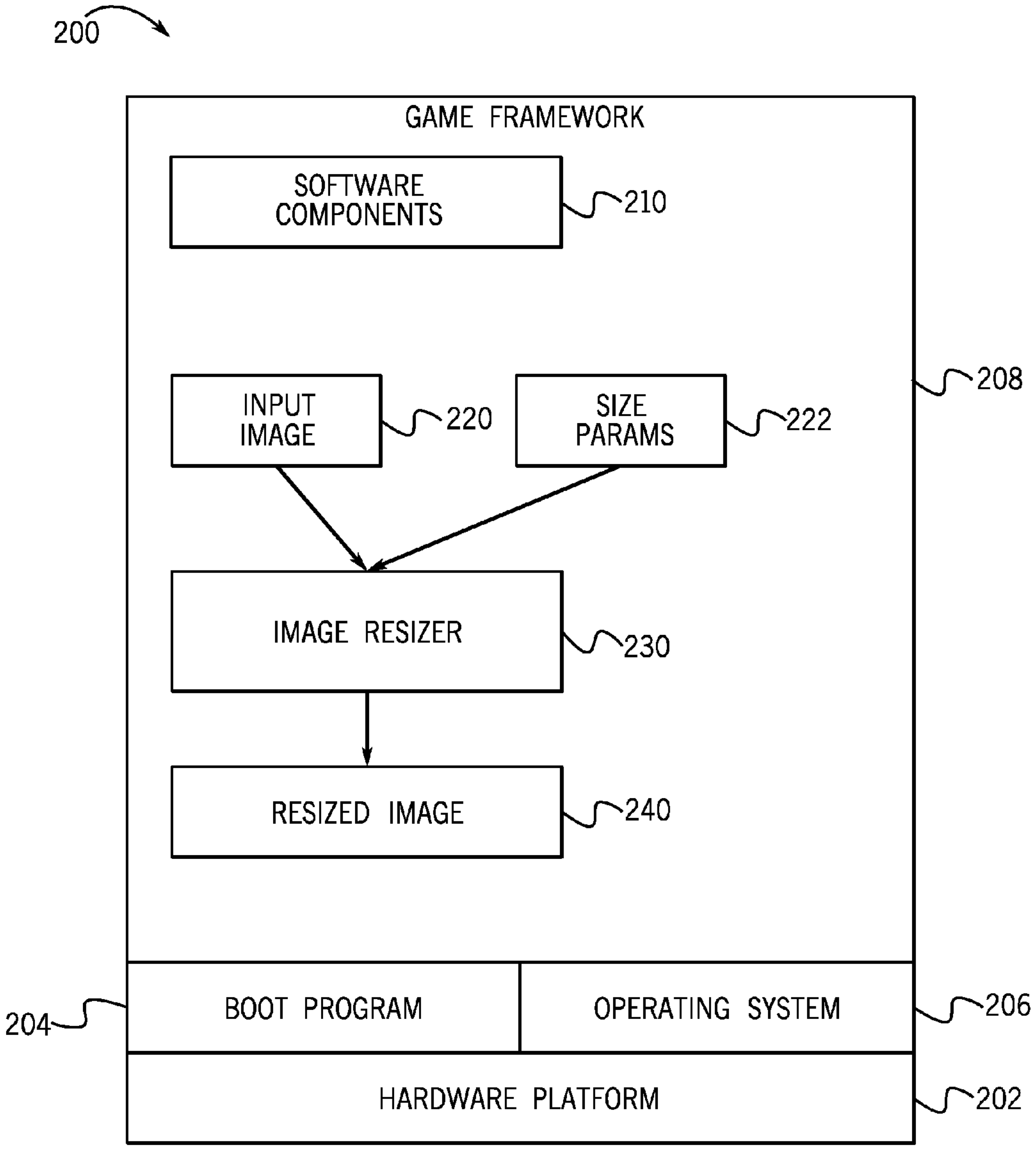
FIG. 2 is a block diagram of a software architecture for a wagering game machine according to an example embodiment.

FIG. 2 is a block diagram of a software architecture 200 for a wagering game machine according to an example embodiment. As shown in FIG. 2, the wagering game architecture includes a hardware platform 202, a boot program 204, an operating system 206, and a game framework 208 that includes one or more wagering game software components 210. In various embodiments, the hardware platform 202 may include a thin-client, thick-client, or some intermediate derivation. The hardware platform 202 may also be configured to provide a virtual client. The boot program 204 may include a basic input/output system (BIOS) or other initialization program that works in conjunction with the operating system 206 to provide a software interface to the hardware platform 202. The game framework 208 may include standardized game software components either independent or in combination with specialized or customized game software components that are designed for a particular wagering game. In one example embodiment, the wagering game software components 210 may include software operative in connection with the hardware platform 202 and operating system 206 to present wagering games, such as video poker, video black jack, video slots, video lottery, etc., in whole or part. According to another example embodiment, the software components 210 may include software operative to accept a wager from a player. According to another example embodiment, one or more of the software components 210 may be provided as part of the operating system 206 or other software used in the wagering game system 200 (e.g., libraries, daemons, common services, etc.).

Framework 208 may also include an image resizer 230. Image resizer 230 receives an input image 220 and resizes the input image 220 according to input parameters 222 to produce a resized image 240. The input image 220 may be a complete image that is to be displayed on a display of a wagering game machine, or it may be a portion of an image (e.g. a sub-image) that is to be combined with other sub-images to form a complete image. The input image 222 may include pixel data, and also may include weighting data used to control how the image is resized. Additionally, input parameters 222 may be used by image resizer 230 to control the extent of the resizing and how the resizing is accomplished. Input parameters 222 may include the resolution of the target display (e.g., the display on which the image is to be presented), a target size, size thresholds, or other data indicating how the image is to be resized. Further, the input parameters may be inferred, for example, a resolution may be inferred from the type of display or wagering game machine.

While input image 220 and size parameters 222 are shown as part of the game framework 208, input image 220 and/or size parameters 222 may be obtained from a variety of sources, including various storage units of a wagering game machine (e.g., hard drives, RAM, Compact Flash etc.). Further, input image 220 and/or size parameters 222 may be obtained from network sources, including the wagering game network illustrated below in FIG. 3. Additionally, image resizer 230 may be provided on a server or other machine or system in a wagering game network and transmit resized image data to a wagering game machine.

Further details on the operation of an image resizer 230 according to embodiments of the invention are provided below.

While FIGS. 1 and 2 describe example embodiments of a wagering game machine hardware and software architecture, FIG. 3 shows how a plurality of wagering game machines can be connected in a wagering game network.

FIG. 3 is a block diagram illustrating a wagering game network 300, according to example embodiments of the invention. As shown in FIG. 3, the wagering game network 300 includes a plurality of casinos 312 connected to a communications network 314.

Each of the plurality of casinos 312 includes a local area network 316, which may include a wireless access point 304, wagering game machines 302, and a wagering game server 306 that can serve wagering games over the local area network 316. As such, the local area network 316 includes wireless communication links 310 and wired communication links 308. The wired and wireless communication links can employ any suitable connection technology, such as Bluetooth, 802.11, Ethernet, public switched telephone networks, SONET, etc. In one embodiment, the wagering game server 306 can serve wagering games and/or distribute content to devices located in other casinos 312 or at other locations on the communications network 314.

The wagering game machines 302 and wagering game server 306 can include hardware and machine-readable media including instructions for performing the operations described herein.

The wagering game machines 302 described herein can take any suitable form, such as floor standing models, handheld mobile units, bartop models, workstation-type console models, etc. Further, the wagering game machines 302 can be primarily dedicated for use in conducting wagering games, or can include non-dedicated devices, such as mobile phones, personal digital assistants, personal computers, etc. In one embodiment, the wagering game network 300 can include other network devices, such as accounting servers, wide area progressive servers, player tracking servers, and/or other devices suitable for use in connection with embodiments of the invention.

In various embodiments, wagering game machines 302 and wagering game servers 306 work together such that a wagering game machine 302 may be operated as a thin, thick, or intermediate client. For example, one or more elements of game play may be controlled by the wagering game machine 302 (client) or the wagering game server 306 (server). Game play elements may include executable game code, lookup tables, configuration files, game outcome, audio or visual representations of the game, game assets or the like. In a thin-client example, the wagering game server 306 may perform functions such as determining game outcome or managing assets, while the wagering game machine 302 may be used merely to present the graphical representation of such outcome or asset modification to the user (e.g., player). In a thick-client example, game outcome may be determined locally (e.g., at the wagering game machine 302) and then communicated to the wagering game server 306 for recording or managing a player's account. Thus as noted above, a server may provide image data for resizing on various wagering game machines in the network, or the server itself may resize image data as described below and provided the resized image data to wagering game machines. The wagering game machines may use different parameters in order to determine an appropriate size of a resized image. For example, machines configured with different resolutions may be able to provide the same wagering game, with each of the wagering game machines resizing the wagering game images according to the display and/or processing capabilities of the individual wagering game machine.

Similarly, functionality not directly related to game play may be controlled by the wagering game machine 302 (client) or the wagering game server 306 (server) in embodiments. For example, power conservation controls that manage a display screen's light intensity may be managed centrally (e.g., by the wagering game server 306) or locally (e.g., by the wagering game machine 302). Other functionality not directly related to game play may include presentation of advertising, software or firmware updates, system quality or security checks, etc.

Example Wireless Environment

In some embodiments, the wireless access point 304 can be part of a communication station, such as wireless local area network (WLAN) communication station including a Wireless Fidelity (WiFi) communication station, or a WLAN access point (AP). In these embodiments, the wagering game machines 302 can be part of a mobile station, such as WLAN mobile station or a WiFi mobile station.

In some other embodiments, the wireless access point 304 can be part of a broadband wireless access (BWA) network communication station, such as a Worldwide Interoperability for Microwave Access (WiMax) communication station, as the wireless access point 304 can be part of almost any wireless communication device. In these embodiments, the wagering game machines 302 can be part of a BWA network communication station, such as a WiMax communication station.

In some embodiments, any of the wagering game machines 302 can part of a portable wireless communication device, such as a personal digital assistant (PDA), a laptop or portable computer with wireless communication capability, a web tablet, a wireless telephone, a wireless headset, a pager, an instant messaging device, a digital camera, a television, or other device that can receive and/or transmit information wirelessly.

In some embodiments, the wireless access point 304 and the wagering game machines 302 can communicate RF signals in accordance with specific communication standards, such as the Institute of Electrical and Electronics Engineers (IEEE) standards including IEEE 802.11(a), 802.11(b), 802.11(g), 802.11(h) and/or 802.11(n) standards and/or proposed specifications for wireless local area networks, but they can also be suitable to transmit and/or receive communications in accordance with other techniques and standards. In some BWA network embodiments, the wireless access point 304 and the wagering game machines 302 can communicate RF signals in accordance with the IEEE 802.16-2004 and the IEEE 802.16(e) standards for wireless metropolitan area networks (WMANs) including variations and evolutions thereof. However, they can also be suitable to transmit and/or receive communications in accordance with other techniques and standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," Can 2005 and related amendments/versions.

In other embodiments, the wireless access point 304 and the wagering game machines 302 can communicate in accordance with a short-range wireless standard, such as the Bluetooth™ short-range digital communication protocol.

It will be appreciated from the above that various components of a wagering game architecture and/or their functionality may be distributed in various manners. For example, all of the components and functionality may reside in a wagering game machine, or various portions may reside in part on a wagering game machine and in part on a server or other network attached device. The scope of the inventive subject matter is meant to include all of these environments.

Figure 4:
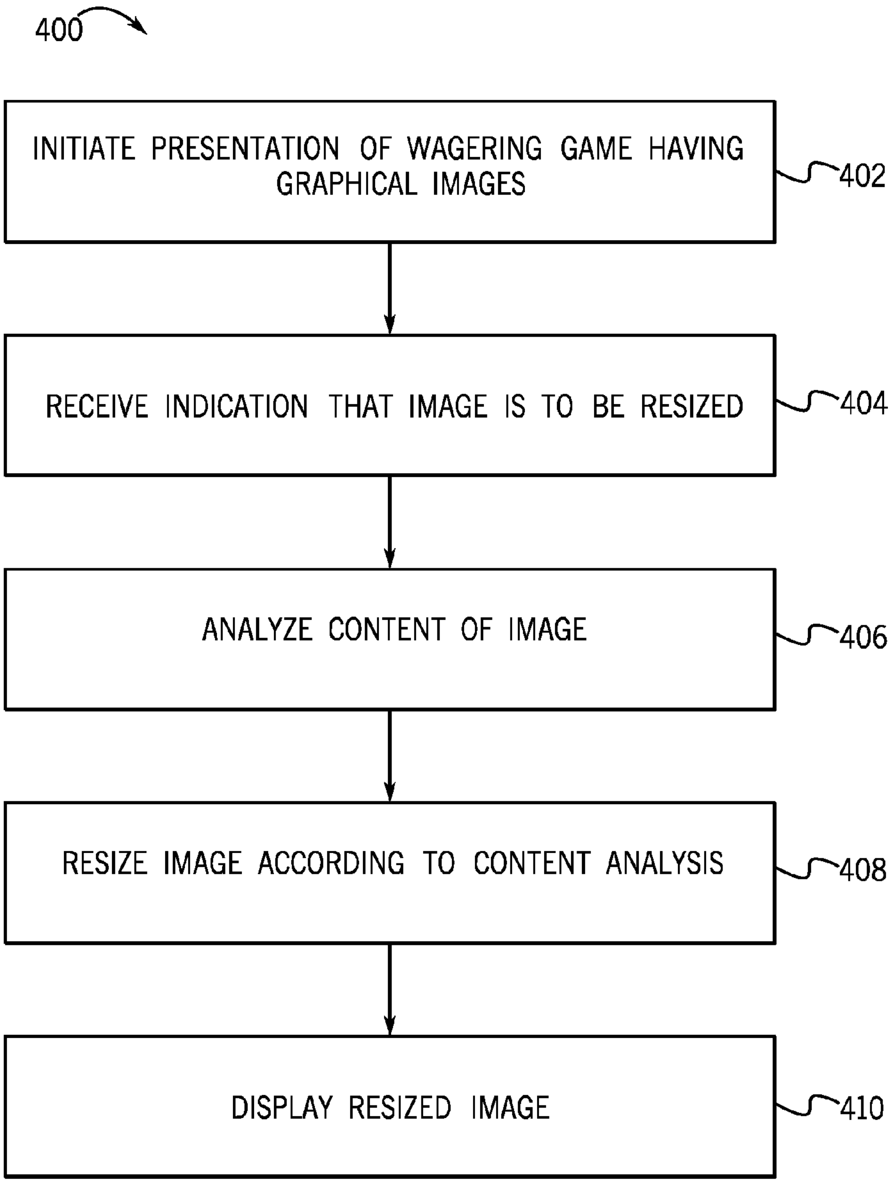
FIG. 4 is a flowchart illustrating methods for resizing graphical images for a wagering game machine according to example embodiments.

FIG. 4 is a flowchart illustrating a method 400 for resizing graphical images for a wagering game machine according to example embodiments. The methods to be performed by an operating environment such as control system 100 and network system 300 constitute computer programs made up of computer-executable instructions. Describing the methods by reference to a flowchart enables one skilled in the art to develop such programs including such instructions to carry out the method on suitable processors for gaming machines (the processor or processors of the computer executing the instructions from computer-readable media). The methods illustrated in FIG. 4 are inclusive of acts that may be taken by an operating environment executing an exemplary embodiment of the invention.

In some embodiments, method 400 begins at block 402 by initiating the presentation of a wagering game upon which monetary value may be wagered. The wagering game may be any type of wagering game such as video versions of a slots, poker, keno, bingo, pachinko, craps or any other type of wagering game. The wagering game has graphical objects that define elements of image to be displayed for the wagering game. For example, graphical objects may be used to define and render reels, symbols, tokens, characters, text, fields, backgrounds or any other object that is displayed as part of an image for a wagering game or a bonus game of a wagering game.

At block 404, a system executing the method receives an indication that an image, or portion of an image is to be resized. The resizing of an image may be indicated based on a variety of events or factors. For example, in some embodiments, an image may be resized based on the different resolutions or display capabilities of a target wagering game machine. This may be desirable when there are various type of hardware platforms having different display capabilities. For example, a wagering game may be available on both a standalone, non portable wagering game machine (see e.g., FIG. 14) and a portable version (see e.g., FIG. 15). One set of base images may be maintained for a wagering game where the image may be resized depending on the platform executing a particular wagering game using the image.

In alternative embodiments, an image may be resized base on the addition or subtraction of other elements from a final image. Such addition or subtraction may include the addition of other wagering games to the display, the addition of help screen images, advertising images, or other images to the display, or the removal of objects from an image as the objects are selected by a user. In further alternative embodiments, the resizing of an image may be indicated when a scene is to be animated. Various examples of indications and events that cause an image to be resized are provided below.

At block 406, the system analyzes the content of the image in order to determine how the image is to be resized. In some embodiments, the "energy" values for each pixel are determined. Various embodiments may employ various algorithms or functions to determine the energy value for the pixels in an image. For example, some embodiments determine an energy value by calculating the difference in intensity around the subject pixel. A high energy value indicates more change in intensity of pixels surrounding the subject pixel while a low energy value indicates that there is not much change in the intensity of the pixels surrounding the subject pixel. Examples of such energy functions include L1 and L2-norm of the gradient, saliency measure, Harris-corners measure, eye gaze measurement, output of face detectors, e1 error, entropy, segmentation, and Histogram of Gradients (HoG). These energy functions are further described in Avidan, S., Shamir, A. 2007. *Seam Carving for Content-Aware Image Resizing*. ACM Trans. Graph. 26, 3, Article 10 (July 2007) and references cited therein, which are hereby incorporated by reference. The choice of a particular energy function to use may be configured for the system, for example, as part of the resizing parameters 222.

At block 408, the system resizes the image according to the content analysis of block 406 and any resizing parameters that have been provided. In some embodiments, the system performs seam carving to repeatedly remove (decreasing image size) or add (increasing image size) one or more horizontal and/or vertical seams for the image until the image reaches a desired size. In general, a seam may be described as a connected path through an image. The path is selected to include low energy pixels such that pixels that are more important to the image (e.g., high energy pixels) are preserved. In some embodiments, a horizontal and/or vertical seam may be determined by minimizing a cost function for the seam, where the cost is the sum of the energy values.

In some embodiments, pixels that would otherwise be considered unimportant (e.g., have relatively low energy values compared to surrounding pixels), may be indicated as important using various mechanisms. In some embodiments, a weighting may be applied to the energy value of pixels considered to be important. Alternatively, the energy values themselves may be adjusted for areas that are important to the image. Example embodiments using such weighting or adjustment are described below.

Further details on the selection of pixels for a seam are provided in *Seam Carving for Content-Aware Image Resizing*, which has been previously incorporated by reference.

At block 410, the resized display image is displayed.

Figure 5A:
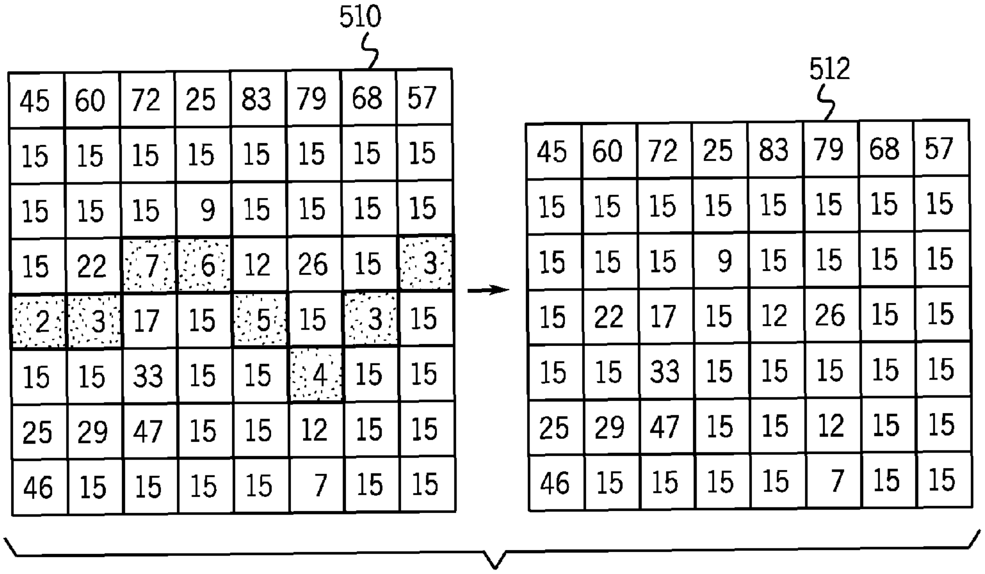
FIGS. 5A and 5B are block diagrams illustrating example image portions used to illustrate the resizing operation of embodiments of the invention.
Figure 5B:
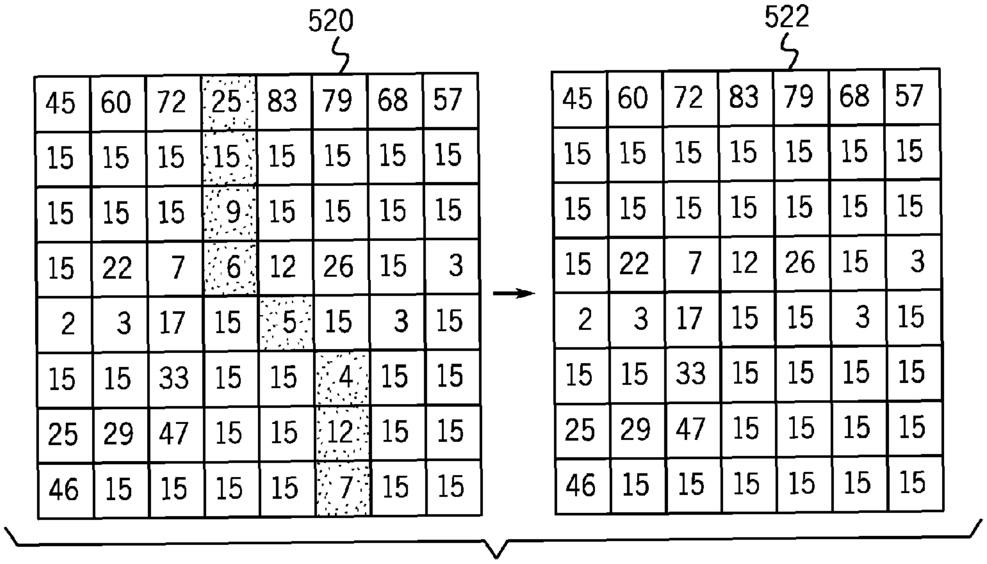

FIGS. 5A and 5B are diagrams illustrating an example images providing "before" and "after" portions of resized image data. In FIG. 5A, an example of an 8 pixel by 8 pixel image data 510 is provided where the value in each position represents the "energy" at that position and where a horizontal seam is to be identified before the image is resized. As noted above, the energy of a particular position may be calculated in a variety of manners now known in the art or developed in the future. The highlighted pixel positions represent a horizontal seam wherein the horizontal seam includes pixel positions having the least energy. Image data 512 is an 8 pixel by 7 pixel portion of image data representing image data 510 after it has been resized by removing pixels in the image that are part of the horizontal seam. The energy values illustrated in image data 512 have been left as they were in image data 510 in order to illustrate the shifting of pixel data. However it should be noted that in actual applications, the energy values would change to reflect the new updated image.

In FIG. 5B, an example of an 8 pixel by 8 pixel image data 520 is provided where the value in each position represents the "energy" at that position and where a vertical seam is to be identified before the image is resized. The highlighted pixel positions represent a vertical seam wherein the vertical seam includes pixel positions having the least energy. Image data 522 is a 7 pixel by 8 pixel portion of image data representing image data 520 after it has been resized by removing pixels in the image that are part of the vertical seam. Again, the energy values illustrated in image data 522 have been left as they were in image data 520 in order to illustrate the shifting of pixel data. However it should be noted that in actual applications, the energy values would change to reflect the new updated image.

Figure 6A:
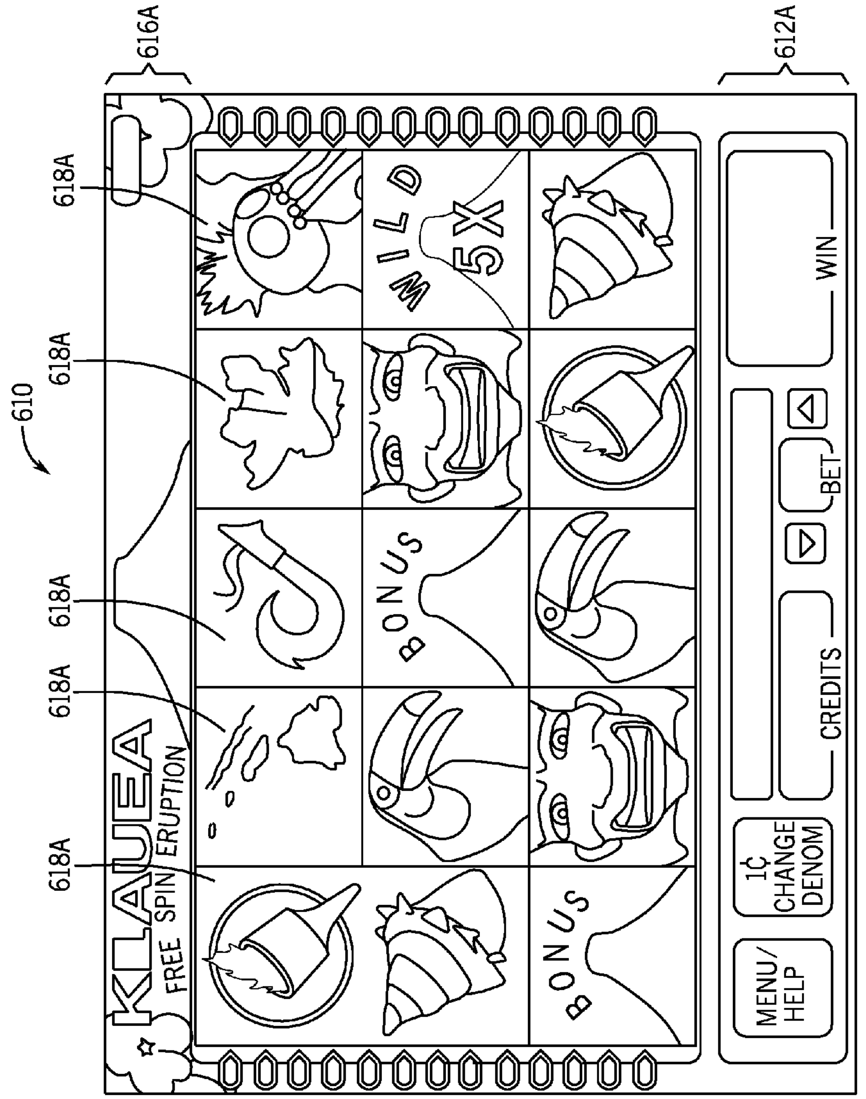
FIGS. 6A and 6B are example before and after example images used to illustrate the resizing operation of embodiments of the invention.
Figure 6B:
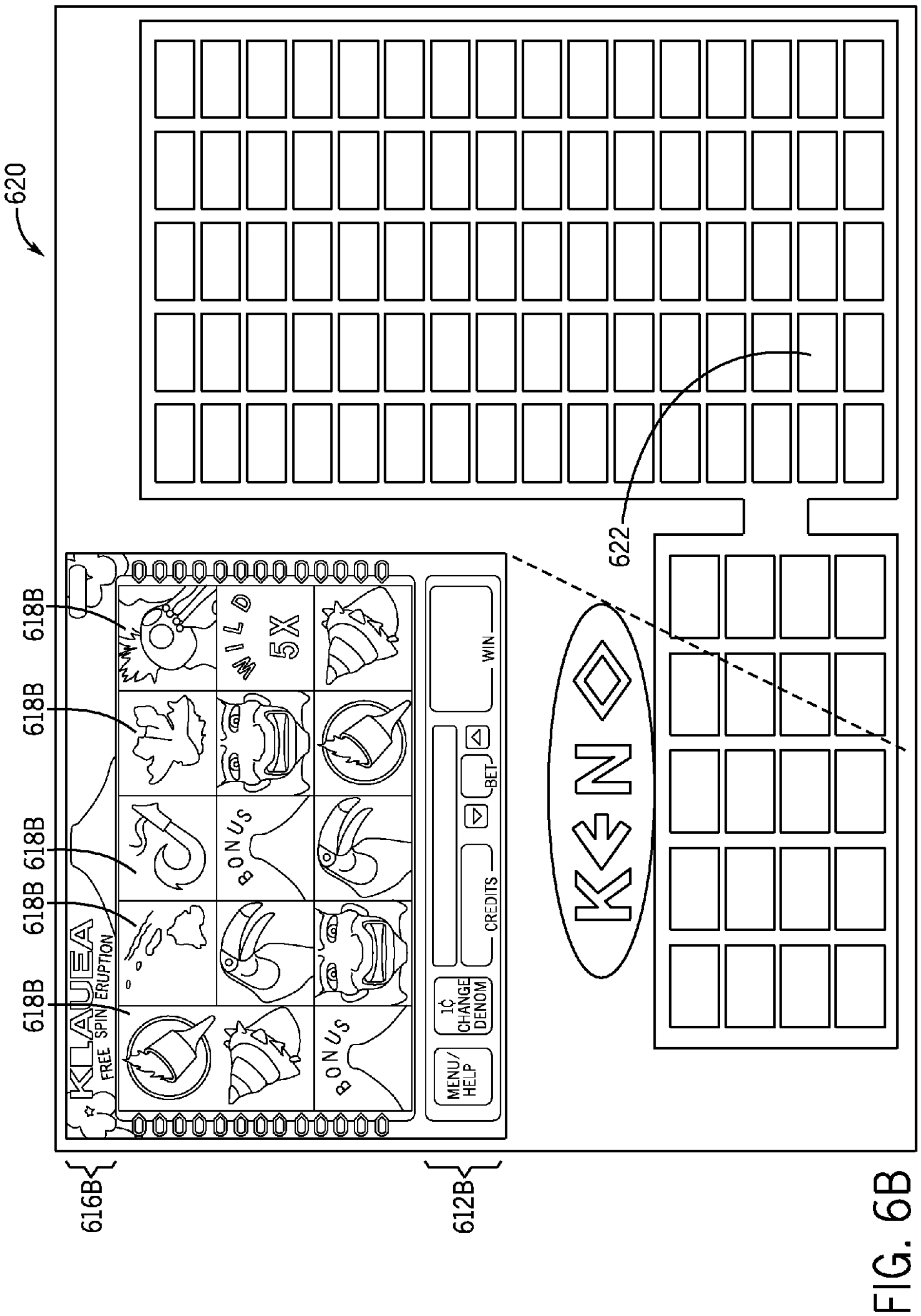

FIGS. 6A and 6B are example "before" and "after" images used to illustrate the resizing operation of embodiments of the invention. In this example, the addition of a new game provides the indication that the screen image is to be resized. FIG. 6A illustrates a "before" image 610. In general, before image 610 includes a user interface area 612, title bar 616, and reels 618. User interface area 612 includes meters (e.g., credit meters), bet amount, denomination, amount won, and help/menu button. Other information may be presented in the user interface area 612 and such information is within the scope of the inventive subject matter.

Reels 618 include reel symbols that are used to display the randomly generated outcome of a wagering game. Although FIG. 6A shows reels and reel symbols, other types of symbols in other configurations could be used and are within the scope of the inventive subject matter. Examples of such symbols include cards as part of a poker hand or other card came, dice, roulette balls, and other symbols used in wagering games.

Title bar 616 provides the name of the wagering game, and may also provide other information or graphics.

FIG. 6B illustrates an "after" image 620. In the example shown, a new game 622 (a keno game for this example) has been added to the display such that two wagering games are displayed simultaneously. In order to accommodate the space required for the new game 622, the reel based game display 610 has been resized using the methods described above. In particular, user interface area 612A, reels 618A and title bar 616A of screen 610 have been resized to 612B, 618B and 616B respectively. Further, the user interface area 612B, reels 618B and title bar 616B have been resized at different rates by removing differing numbers of horizontal and vertical seams to reflect the relative importance. Such resizing may be accomplished as discussed above by weighting the energy levels or adjust the energy levels of the pixels of the respective areas to reflect their importance to the overall image. In some embodiments, resizing particular graphical objects may be controlled by a threshold value such that the weighting is adjusted upon reaching the threshold. This allows objects to be resized to various limits, and the rate of resizing adjusted such that resizing slows or halts for particular graphical objects. Further, some embodiments may maintain multiple thresholds for resizing graphical objects in an image. Alternatively, once a resize threshold has been reached, the graphical object may be converted to a different representation. For example, an image representing a wagering game may be reduced in size using content aware resizing until a predetermined threshold is reached where the game is no longer easily playable. At this threshold, the wagering game image may be converted to an icon allowing the player to play other wagering games concurrently displayed on the screen. The user may then interact with the icon to resume playing the wagering game represented by the icon.

Size thresholds may be used in other ways in various embodiments. For example, a symbol may be resized (either by a player or autonomously by the system). Once the symbol reaches a particular size, the symbol may be enhanced or replaced with another symbol, which may continue to be resized. For example, upon enlarging a symbol to a particular threshold, a pay table may replace or appear in the symbol.

Figure 7:
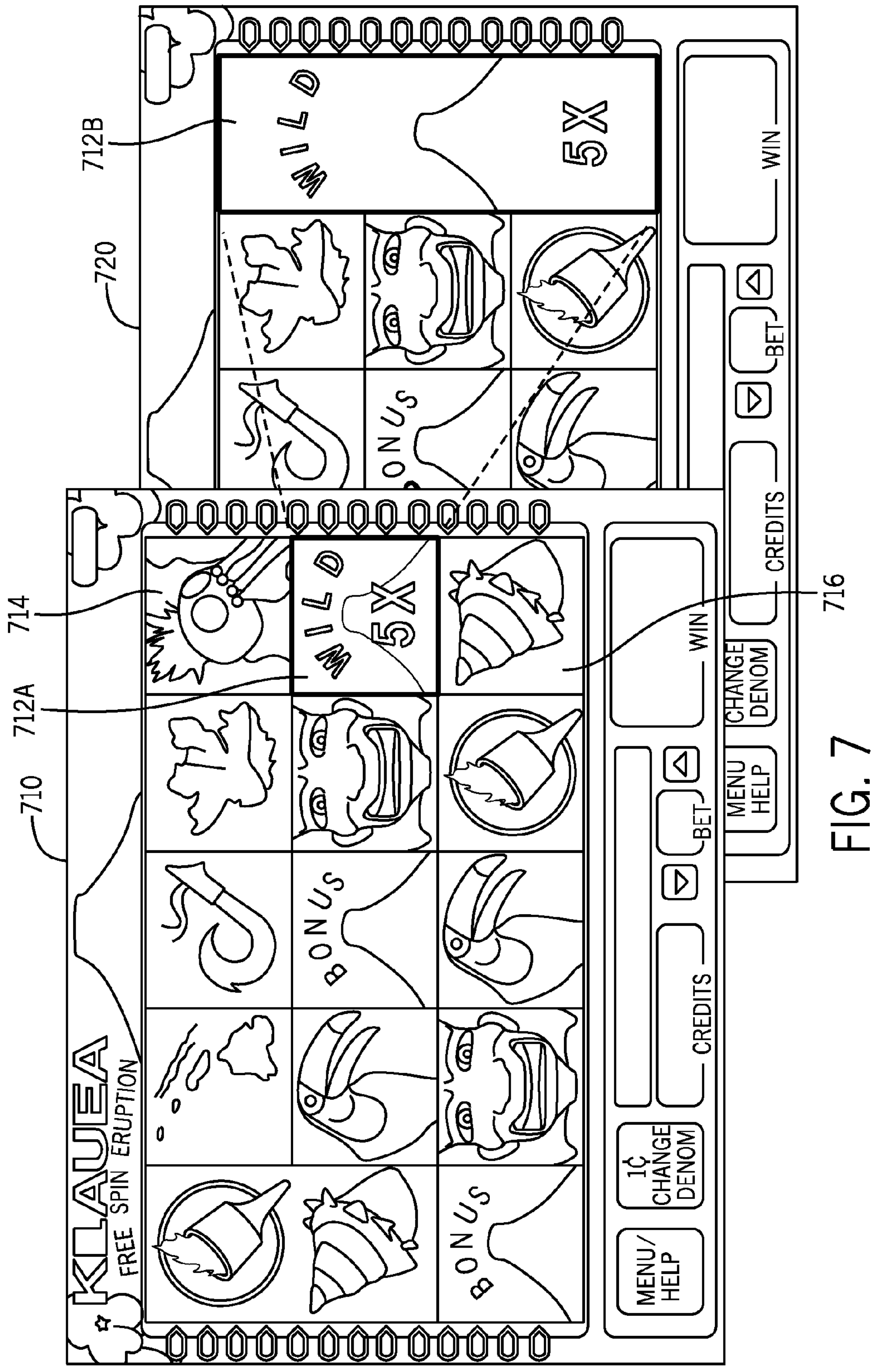
FIG. 7 provides example screens illustrating the resizing operation of alternative embodiments of the invention.

FIG. 7 provides example screens 710 and 720 illustrating the resizing operation of alternative embodiments of the invention. In this example, the appearance of a particular wagering game symbol indicates the need for resizing of at least a portion of a screen image. Screen 710 illustrates a "before" image reflecting an image before resizing. The image includes reel symbols 712A, 714 and 716 on a vertical spinning reel. Reel symbol 712A is a wild symbol. Further, reel symbol 712A is what is known as an "expanding wild", a symbol that expands during wagering game play to cover multiple symbol areas. Screen 720 is a screen image of an example screen after the wild symbol has been resized using the methods discussed above. In the example shown, horizontal seams have been added to reel symbol 712A to create expanded reel symbol 712B. The expanded wild symbol 712B covers the space occupied by symbols 714 and 716. Although reel symbols have been used in the example shown in FIGS. 7A and 7B, other symbols such as cards, dice, roulette balls and wheels, bingo cards and balls, etc. may be used and are within the scope of the inventive subject matter.

Figure 8:
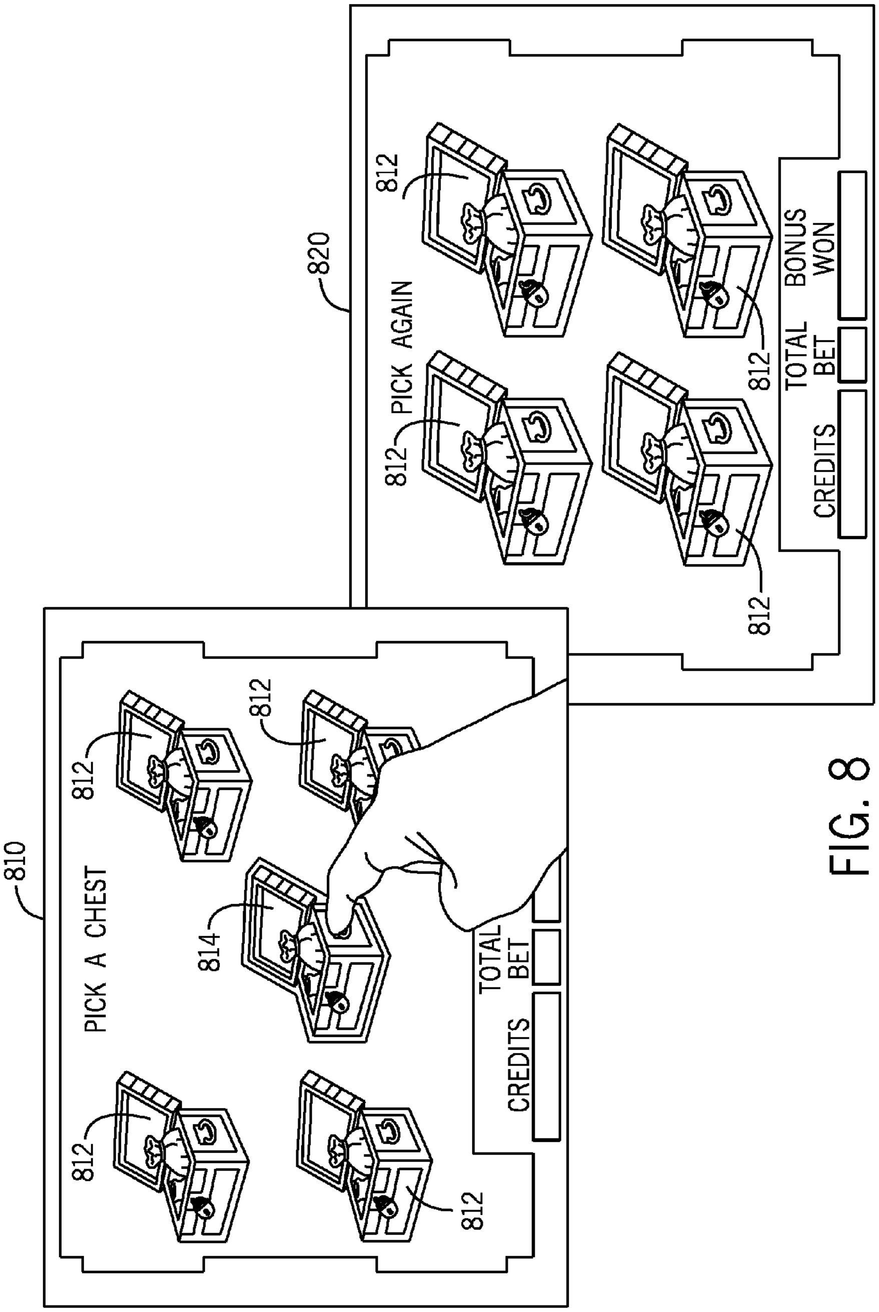
FIG. 8 provides example screens illustrating the resizing operation of further alternative embodiments of the invention.

FIG. 8 provides example screens illustrating the resizing operation of further alternative embodiments of the invention. In this example, the selection of a symbol indicates that at least a portion of the screen image needs to be resized. The example illustrated in FIG. 8 shows a "before" image 810 and an "after" image 820. For the purposes of this example, images 810 and 820 represent screens providing an interface to select treasure chests 812, 814. Once selected, the selected treasure chest is removed from the screen. In the example shown, chest 814 has been selected as illustrated in screen image 810. The image is adjusted such that chest 814 is not shown in image 820. Further, the image is resized such that the remaining chests 812 fill in where chest 814 was removed. The resizing may be accomplished using the systems and methods described above. In some embodiments, the image portion representing chests 812 may have their corresponding energy values weighted or adjusted such that seams are added to the image to expand the chests in horizontal and/or vertical directions. Thus the remaining chests appear to fill up the screen as other chests are selected and removed.

Figure 9:
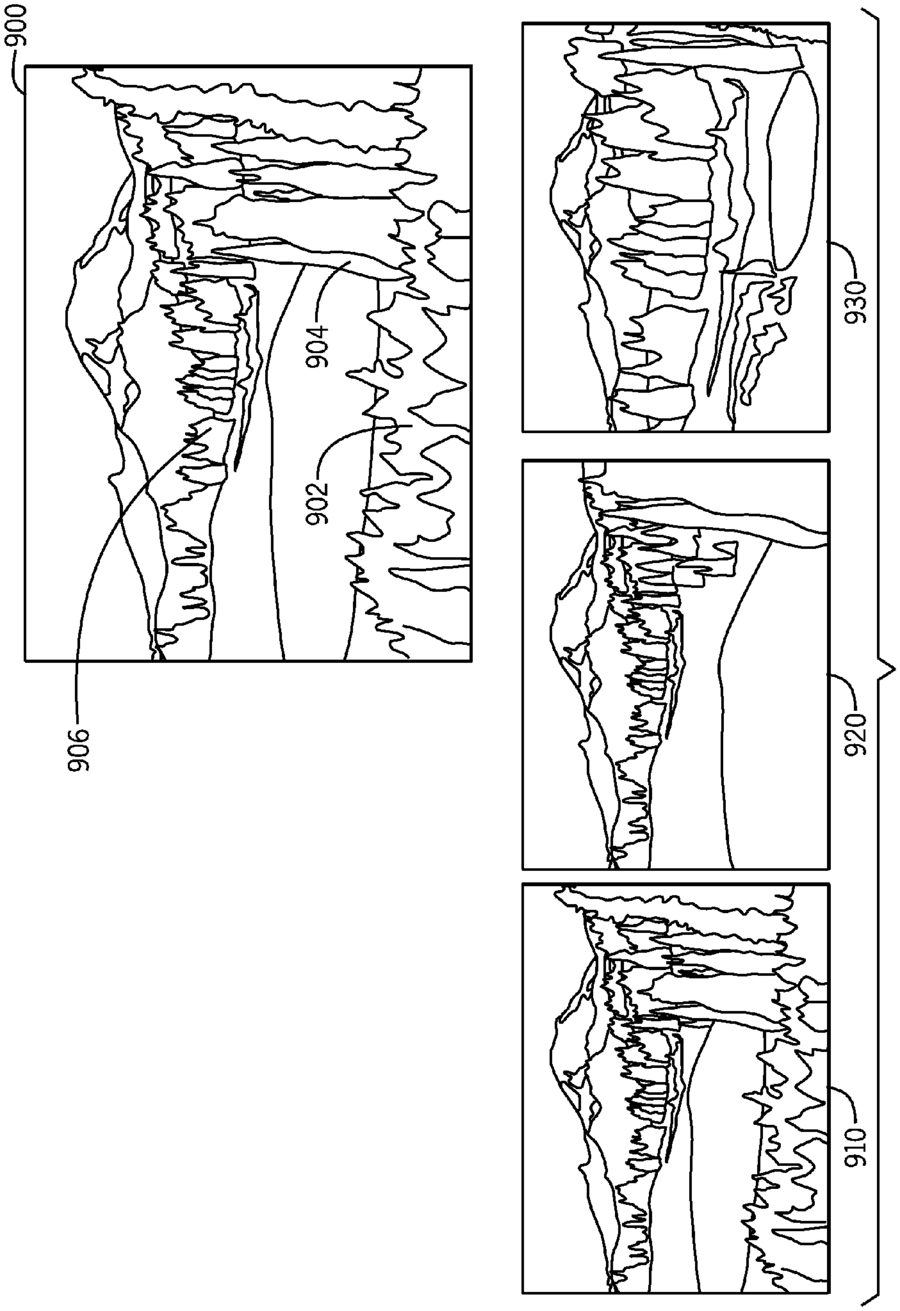
FIG. 9 provides example screens illustrating resizing areas of an image to simulate animation according to example embodiments of the invention.

FIG. 9 provides example screens illustrating resizing areas of an image to simulate animation according to example embodiments of the invention. Thus in this example, the start of an animation during the presentation of a wagering game indicates that portions of the screen image need to be resized. In the example shown, a multiplane scene animation of a scene 900 is described. In this example, the image for scene 900 is divided into a foreground area 902, a middleground area 904, and a background area 906. The foreground, middleground, and background areas may be encoded in a variety of manners. In order to animate the scene, each areas is resized at different rates to create the illusion of moving through distance. For example, foreground area 902 may be resized at a greater rate than the middleground area 904, which in turn is resized at a greater rate than background area 906. Background area 906 may be resized at the lowest rate, or not resized at all. The resizing of each individual area may be accomplished using the seam carving method described above, in which seams are added to expand an area and seams are removed to shrink an area. Such expansion and shrinking through resizing provides the illusion of movement either close to, or away from the scene 900. Screen images 910, 920 and 930 illustrates the change in the size of the foreground, middleground and background areas at various points in time as the animation progresses. Those of skill in the art will appreciate that although three areas have been shown in this example, that other numbers of areas may be used and are within the scope of the inventive subject matter.

Figure 10:
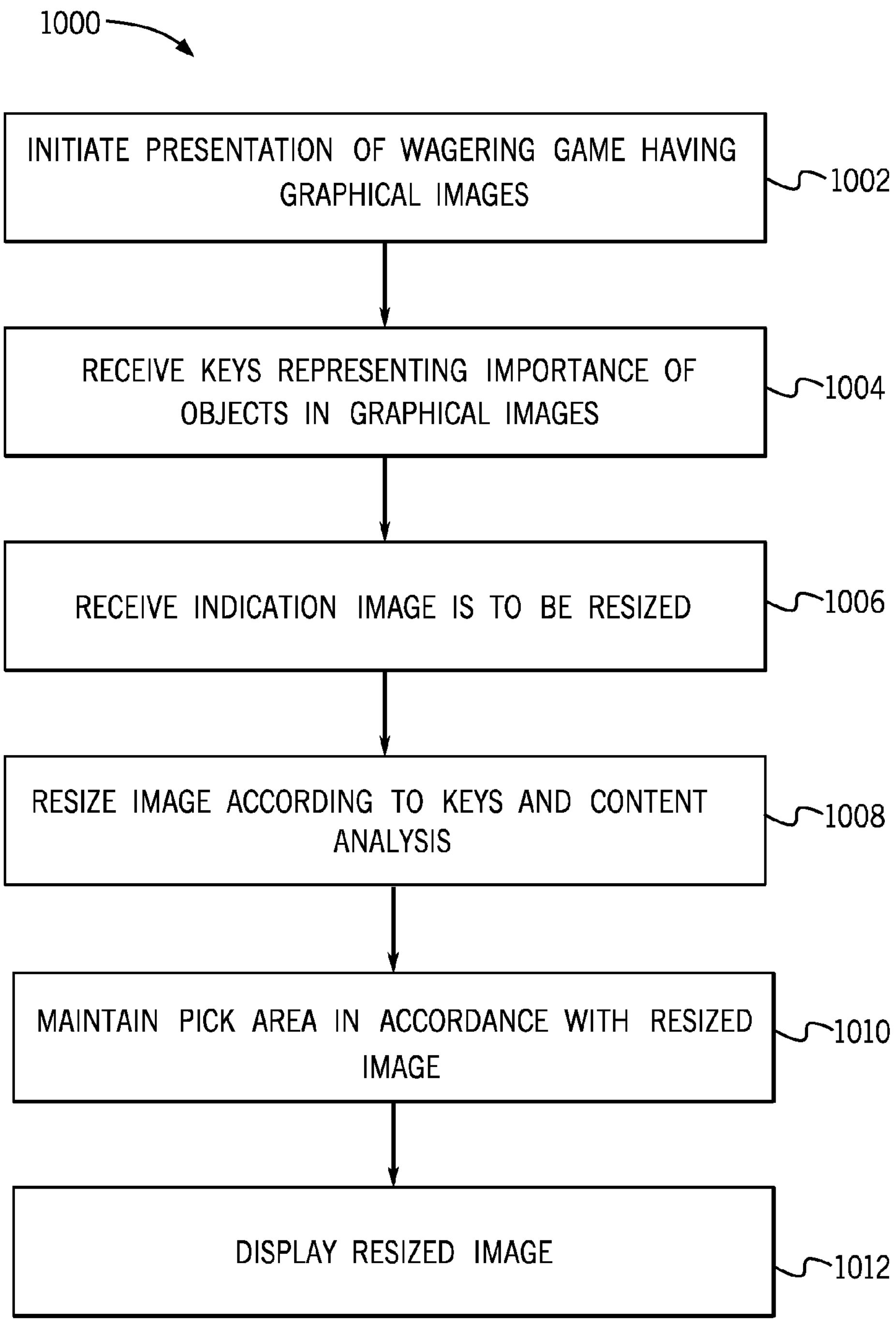
FIG. 10 is a flowchart illustrating methods for keying pick areas of graphical images for a wagering game machine according to example embodiments.

FIG. 10 is a flowchart illustrating a method 1000 for keying pick areas of graphical images for a wagering game machine according to example embodiments. In some embodiments, the method begins at block 1002 by initiating the presentation of a wagering game upon which monetary value may be wagered. The wagering game may be any type of wagering game such as video versions of a slots, poker, keno, bingo, pachinko, craps or any other type of wagering game. The wagering game has graphical objects that define elements of image to be displayed for the wagering game. For example, graphical objects may be used to define and render reels, symbols, tokens, characters, text, fields, backgrounds or any other object that is displayed as part of an image for a wagering game or a bonus game of a wagering game. Some or all of the graphical objects may be pickable objects, that is, they may be capable of being selected by a user interface utilizing a touch screen or pointer device.

At block 1004, a system executing the method receives keys that represent the importance of certain graphical objects in the image. For example, the pickable objects may be keyed as "important" such that they are not resized as much as other parts of the image. The keying may be used to adjust or determine weights or energy levels in the seam carving method described above such that the important objects are not resized as much as other objects. In some embodiments, keying an object is accomplished by isolating the important object on the screen, perhaps by using a simple key color, or by determining saturation levels of the graphic.

At block 1006, a system executing the method receives an indication that an image, or portion of an image is to be resized. The resizing of an image may be indicated based on a variety of events or factors. For example, the user may have indicated that the screen is to be resized using a user interface, thereby causing the content aware methods described above to resize the image. Alternatively, the system may determine that the image is to be resized in response the addition or change to wagering game, user interface element, wagering game portal interface element, help screen images, advertising images or other change resulting in the addition or removal of elements from a current screen image.

At block 1008, the system resizes the image. As noted above, the system analyzes the content as described above with reference to block 406 in order to determine how the image is to be resized. Further, as noted above, pixel energy values may be used to determine how the image is to be resized. Additionally, the key values may be analyzed received at block 1004 may be used to determine how the image to be resized or to adjust the energy value or weighting. The system then resizes the image according to the content analysis of block 406 and any resizing parameters that have been provided. As discussed above, in some embodiments, the system performs seam carving to repeatedly remove (decreasing image size) or add (increasing image size) one or more horizontal and/or vertical seams for the image until the image reaches a desired size. In some embodiments, graphical elements that have been keyed as important (e.g. pickable items) may be limited with respect to how small or how large the element may become after resizing. Imposing such limits is desirable because it prevents pickable items from becoming too small.

At block 1010, the pick area for the pickable items in the image is adjusted such that it matches the size of the resized pickable graphic elements. At block 1012, the resized display image is displayed.

Figure 11A:
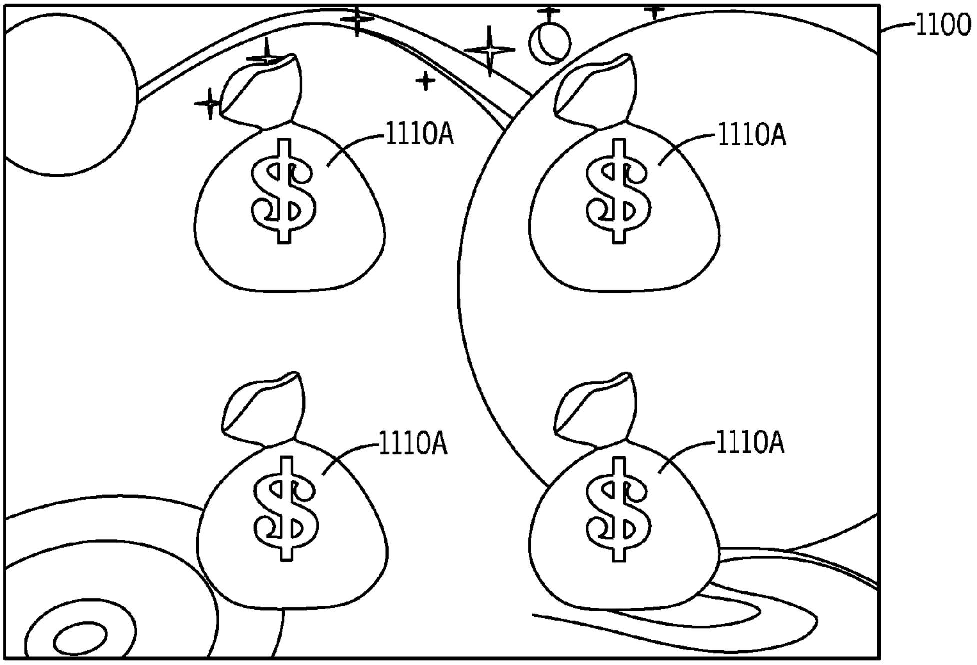
FIGS. 11A-11D are block diagrams illustrating example images portions used to illustrate keying pick areas according to embodiments of the invention.

FIGS. 11A-11D are block diagrams illustrating example images portions used to illustrate keying pickable objects and pick areas according to embodiments of the invention. FIG. 11A illustrates an initial screen image 1100, with assorted pickable objects 1110A (e.g., money bags) positioned on screen. Screen image 1100 may be a full screen image.

Figure 11B:
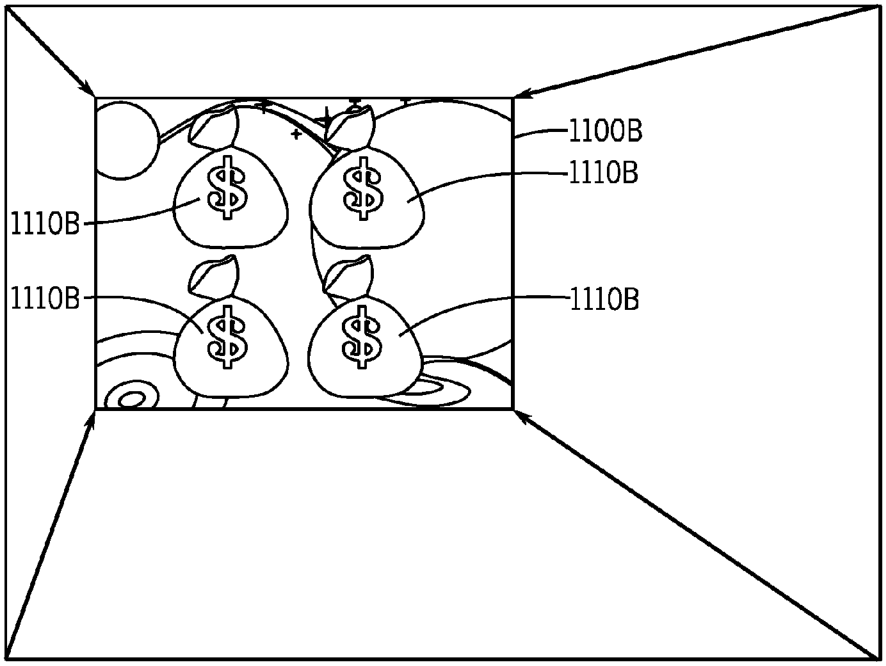

FIG. 11B illustrates a resized screen image 1100B that has been resized from initial screen 1100A. The image has been resized as indicated by the arrows in FIG. 11B. The image may be resized in response to any of a number of different events (perhaps by dragging a corner), and in the example has been resized down to a restricted smaller size (restricted because it can't be too difficult to pick from the resized objects). Resizing is accomplished using the content aware analysis described above in which horizontal and/or vertical seams have been removed from the image. The positions and size of pickable objects 1110B relative to the background have changed so as to make good use of the available space. In the example shown, the pickable objects have been defined as important, and they scale less to maintain a larger pick area. As illustrated in FIG. 11B, the pickable objects 1110B (i.e., the money bags) have less background space around them as they are scaled down when compared to screen 1100A.

Figure 11C:
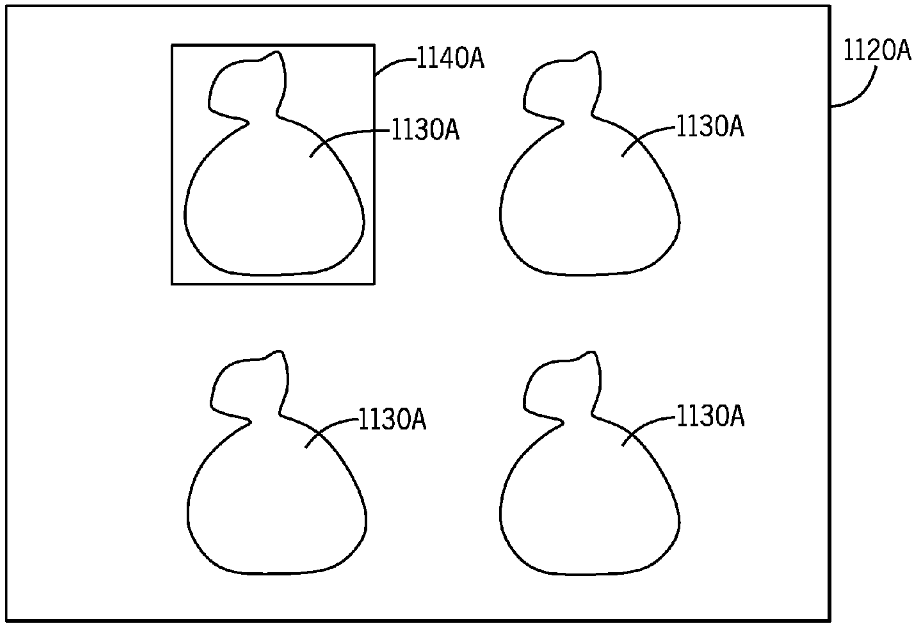

FIG. 11C illustrates keying according to an embodiment of the invention. In the example shown in FIG. 11C, the pickable objects 1130A (i.e., the money bags) have been keyed as white and the background is keyed as black. In some embodiments, the visual resizing of pickable objects may be maintained with one piece of art if the pickable objects are assigned, or keyed. For this example, we can isolate the important element on the screen, perhaps by using a simple key color, or by determining a saturation levels of the graphic. The keying may also designate the touch screen element's bounding box 1140A.

Figure 11D:
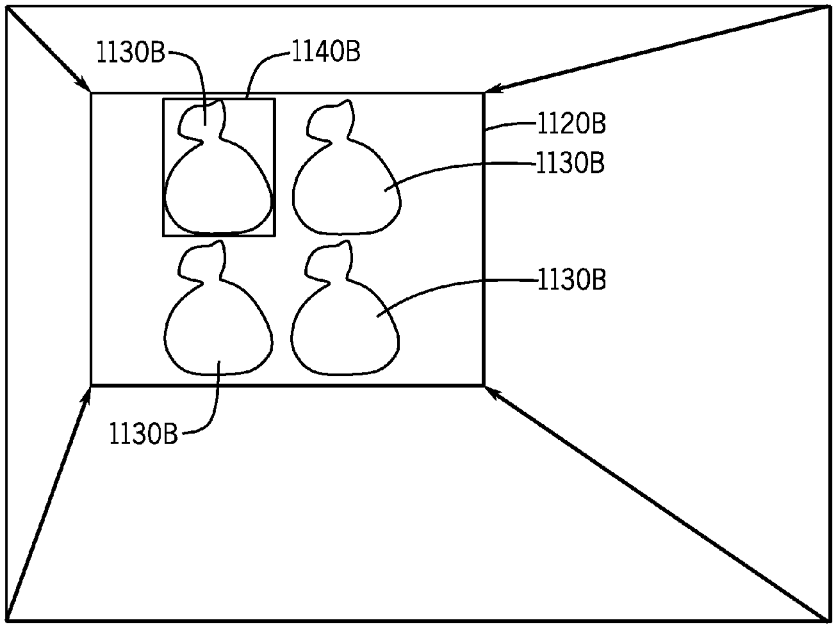

FIG. 11D illustrates resizing of keyed objects and bounding boxes according to embodiments of the invention. In FIG. 11D, screen image 1120A has been resized to image 1120B, with the keyed objects 1130B corresponding to the resized pickable objects 1130A. Further, bounding box 1140B has been resized in accordance with the resizing of the pickable objects and their associated key.

As can be seen from the above, the systems and methods illustrated above provide a mechanism for a player or system to resize the images of a wagering game where the pickable objects are changed on the fly to any size in between a maximum and minimum sizes and where the pick area is maintained as the pickable object is resized.

Figure 12:
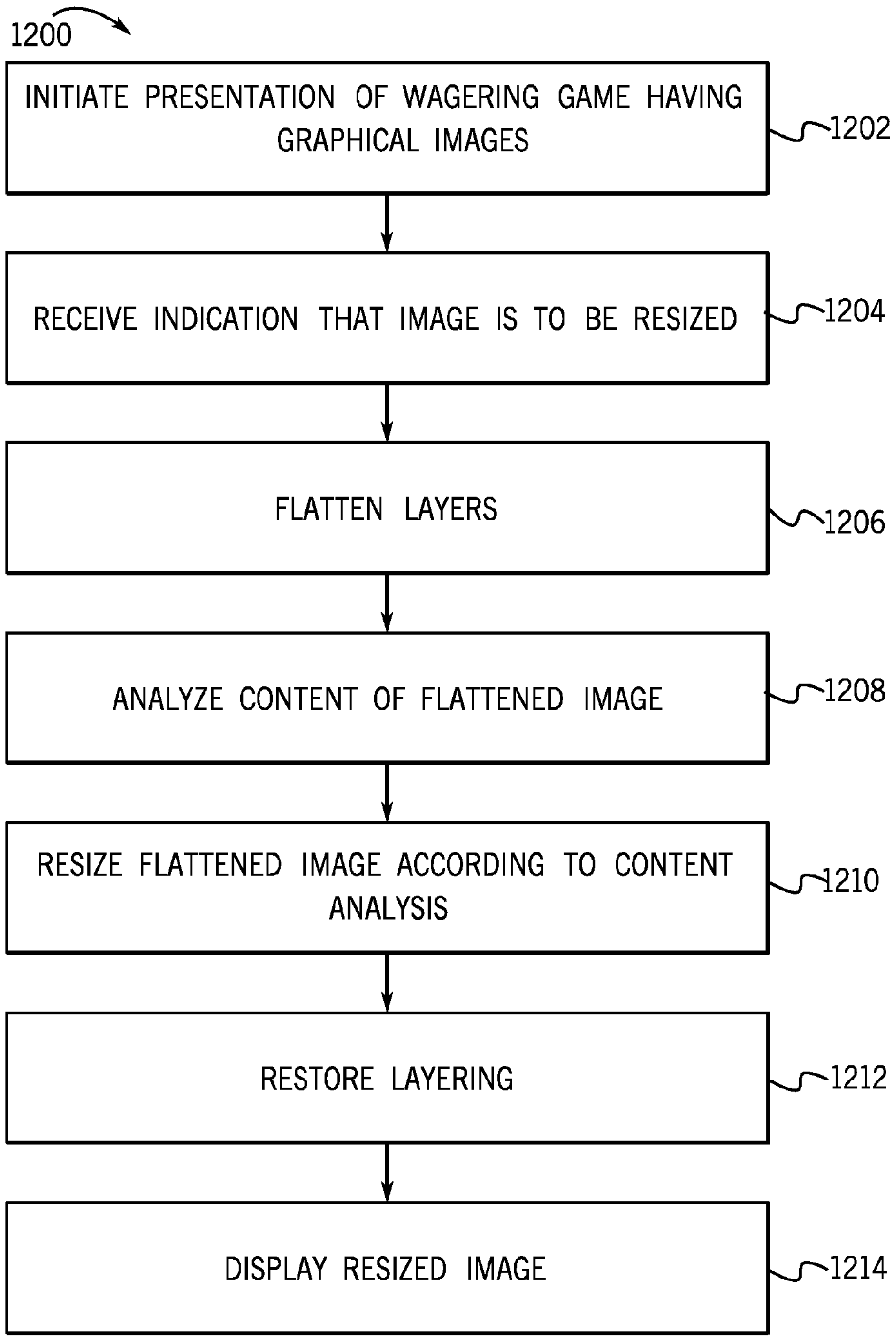
FIG. 12 is a flowchart illustrating methods for resizing layers of graphical images for a wagering game machine according to example embodiments.

FIG. 12 is a flowchart illustrating a method 1200 for resizing layers of graphical images for a wagering game machine according to example embodiments. In some embodiments, method 1200 begins at block 1202 by initiating the presentation of a wagering game upon which monetary value may be wagered. The wagering game may be any type of wagering game such as video versions of a slots, poker, keno, bingo, pachinko, craps or any other type of wagering game. The wagering game has graphical objects that define elements of image to be displayed for the wagering game. For example, graphical objects may be used to define and render reels, symbols, tokens, characters, text, fields, backgrounds or any other object that is displayed as part of an image for a wagering game or a bonus game of a wagering game. The graphical objects may be arranged in multiple layers in order to facilitate pickable objects as described above, or for convenience or efficiency in rendering a screen for a wagering game. Any number of layers may exist.

At block 1204, a system executing the method receives an indication that an image, or portion of an image is to be resized. The resizing of an image may be indicated based on a variety of events or factors, as has been described above. For example, in some embodiments, an image may be resized based on the different resolutions or display capabilities of a target wagering game machine. In alternative embodiments, an image may be resized base on the addition or subtraction of other elements from a final image. Such addition or subtraction may include the addition of other wagering games to the display, the addition of help screen images, advertising images, or other images to the display, or the removal of objects from an image as the objects are selected by a user. In further alternative embodiments, the resizing of an image may be indicated when a scene is to be animated.

At block 1206, the system flattens the layers into a single image. In general, flattening layers of an image combines two or more separate image layers into a single layer.

At block 1208, the system then analyzes the content of the flattened image as described above with reference to block 406 of FIG. 4.

At block 1210, the system resizes the flattened image according to the content analysis of block 1208 and any resizing parameters that have been provided. As described above, in some embodiments, the system performs seam carving on the flattened image to repeatedly remove (decreasing image size) or add (increasing image size) one or more horizontal and/or vertical seams for the flattened image until the flattened image reaches a desired size.

At block 1212, the system restores the layering for the image, separating the image layers from the flattened and resized image. The layers thus reflect the resizing performed at block 1210. The system may use keys or indicators in the image data to determine the appropriate layer for various portions of the image. Separating the flattened image into layers is desirable because it allows for system and players to interact in an appropriate manner after the layers are resized.

At block 1210, the resized image is displayed.

Figure 13A:
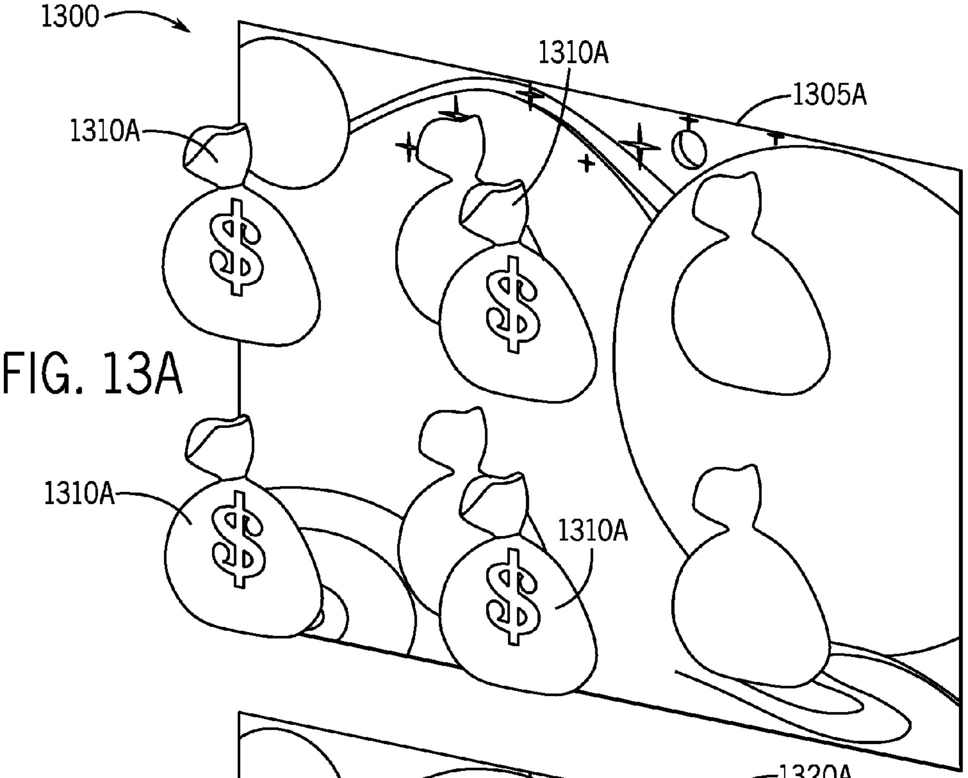
FIGS. 13A-13D are block diagrams illustrating example images portions used to illustrate resizing layers according to embodiments of the invention.

FIGS. 13A-13D are block diagrams illustrating example images portions used to illustrate resizing layered images according to embodiments of the invention, and as described above in FIG. 12. FIG. 13A illustrates an initial image 1300. In the example shown image 1300 has two layers, a background layer 1305 and a second layer having images of pickable items 1310 (e.g., treasure bags). It should be noted that while two layers are illustrated in FIG. 13A, other numbers of layers could be used and are within the scope of the inventive subject matter. For example, reels, bonus games and other wagering game elements may be placed in various layers.

Figure 13B:
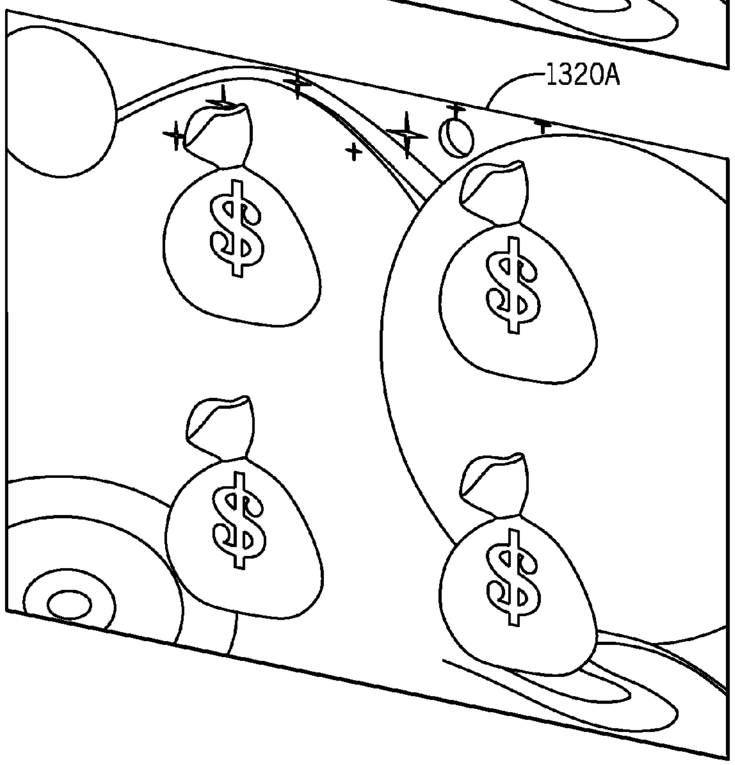

FIG. 13B illustrates an image 1320A after the layers in image 1300 have been flatted. Pickable items 1310 are now part of layer 1320A.

Figure 13C:
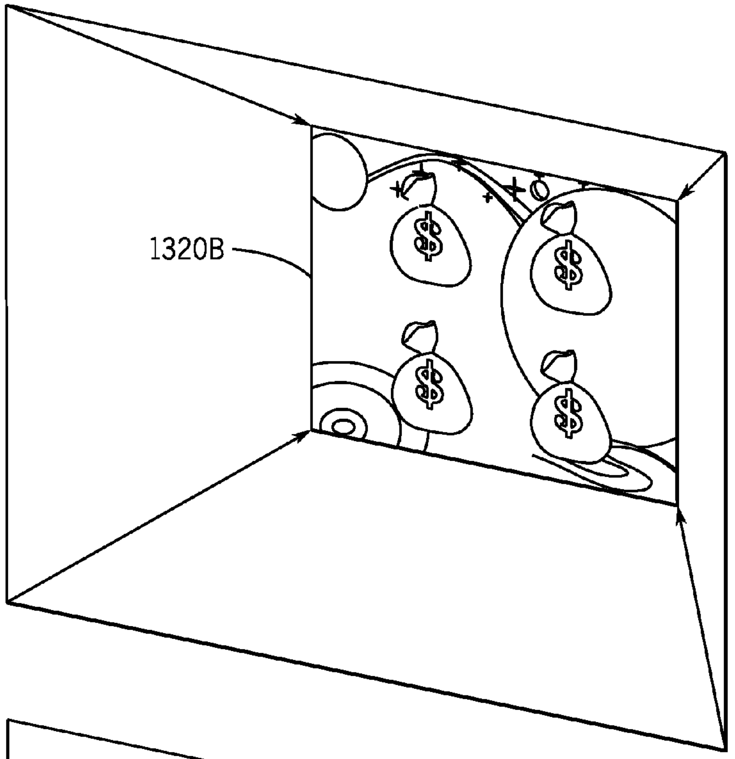

FIG. 13C illustrates a resized image 1320B that represents image 1320A after it has been resized using the methods described above. For example, seam carving or other content aware resizing methods may be applied to the image to remove portions of the image that are not important to the overall image.

Figure 13D:
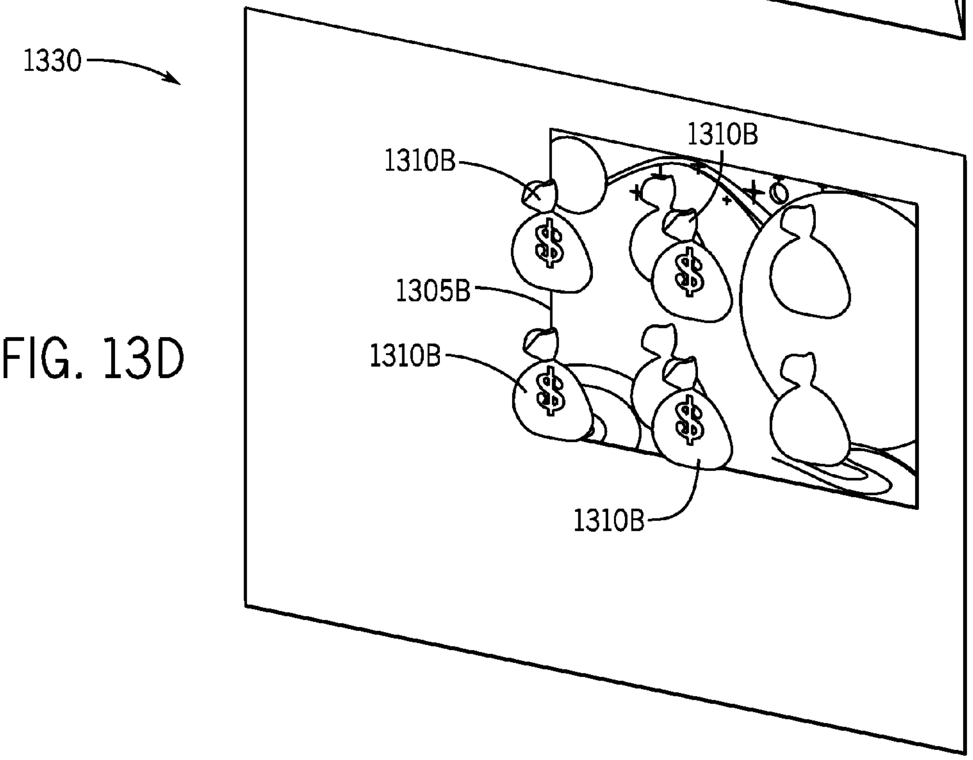

FIG. 13D illustrates an image 1330 where the layers have been separated from the flatted image 1320B. Pickable elements 1320B are illustrated in a layer that has been separated from background layer 1305B.

Example Wagering Game Machine

Figure 14:
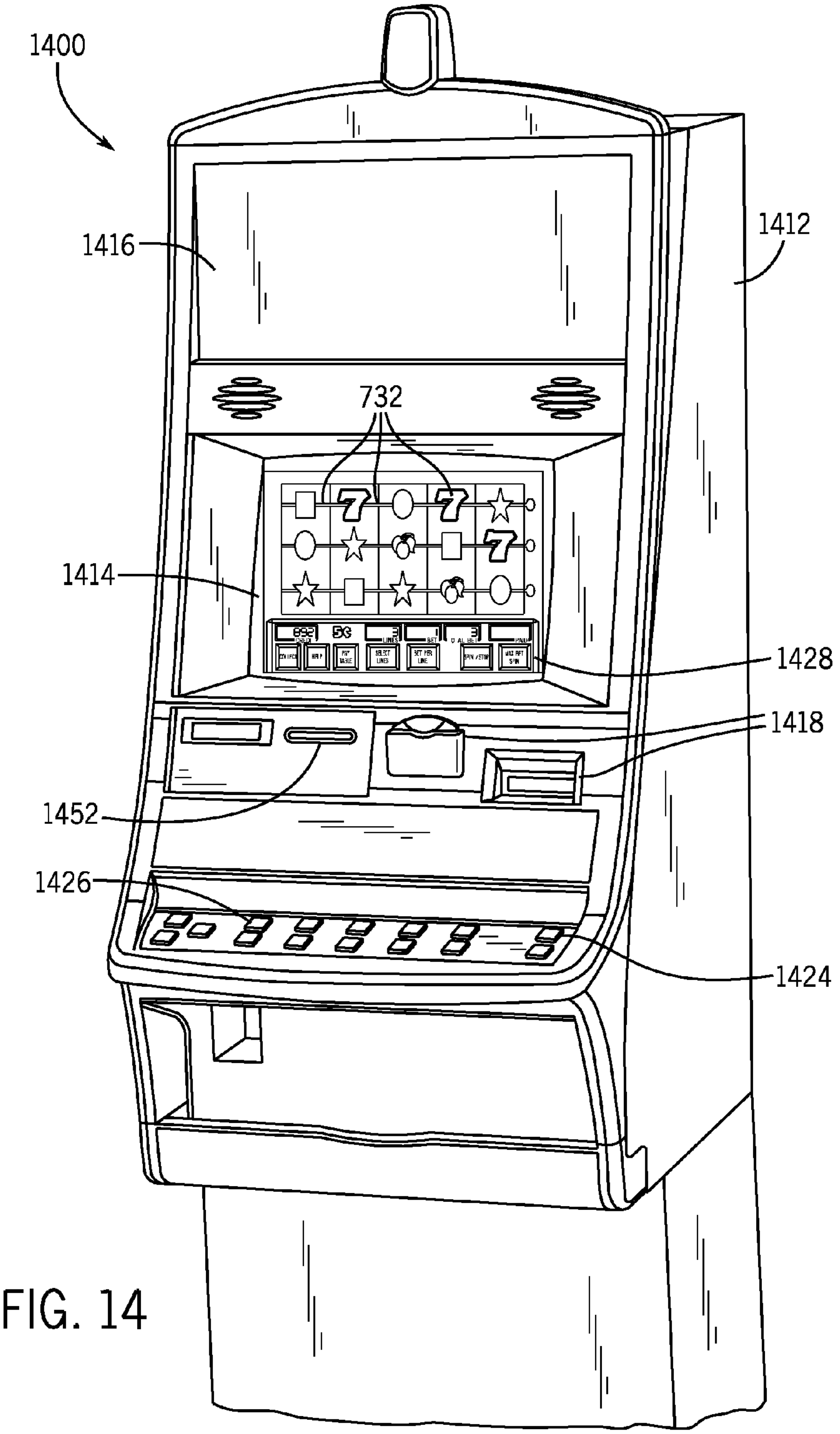
FIG. 14 is a perspective view of a wagering game machine, according to example embodiments of the invention.

FIG. 14 is a perspective view of a wagering game machine, according to example embodiments of the invention. Referring to FIG. 14, a wagering game machine 1400 is used in gaming establishments, such as casinos. According to embodiments, the wagering game machine 1400 can be any type of wagering game machine and can have varying structures and methods of operation. For example, the wagering game machine 1400 can be an electromechanical wagering game machine configured to play mechanical slots, or it can be an electronic wagering game machine configured to play video casino games, such as blackjack, slots, keno, poker, blackjack, roulette, etc.

The wagering game machine 1400 comprises a housing 1412 and includes input devices, including value input devices 1418 and a player input device 1424. For output, the wagering game machine 1400 includes a primary display 1414 for displaying information about a basic wagering game. The primary display 1414 can also display information about a bonus wagering game and a progressive wagering game. The wagering game machine 1400 also includes a secondary display 1416 for displaying wagering game events, wagering game outcomes, and/or signage information. While some components of the wagering game machine 1400 are described herein, numerous other elements can exist and can be used in any number or combination to create varying forms of the wagering game machine 1400.

The value input devices 1418 can take any suitable form and can be located on the front of the housing 1412. The value input devices 1418 can receive currency and/or credits inserted by a player. The value input devices 1418 can include coin acceptors for receiving coin currency and bill acceptors for receiving paper currency. Furthermore, the value input devices 1418 can include ticket readers or barcode scanners for reading information stored on vouchers, cards, or other tangible portable storage devices. The vouchers or cards can authorize access to central accounts, which can transfer money to the wagering game machine 1400.

The player input device 1424 comprises a plurality of push buttons on a button panel 1426 for operating the wagering game machine 1400. In addition, or alternatively, the player input device 1424 can comprise a touch screen 1428 mounted over the primary display 1414 and/or secondary display 1416.

The various components of the wagering game machine 1400 can be connected directly to, or contained within, the housing 1412. Alternatively, some of the wagering game machine's components can be located outside of the housing 1412, while being communicatively coupled with the wagering game machine 1400 using any suitable wired or wireless communication technology.

The operation of the basic wagering game can be displayed to the player on the primary display 1414. The primary display 1414 can also display a bonus game associated with the basic wagering game. The primary display 1414 can include a cathode ray tube (CRT), a high resolution liquid crystal display (LCD), a plasma display, light emitting diodes (LEDs), or any other type of display suitable for use in the wagering game machine 1400. Alternatively, the primary display 1414 can include a number of mechanical reels to display the outcome. In FIG. 14, the wagering game machine 1400 is an "upright" version in which the primary display 1414 is oriented vertically relative to the player. Alternatively, the wagering game machine can be a "slant-top" version in which the primary display 1414 is slanted at about a thirty-degree angle toward the player of the wagering game machine 1400. In yet another embodiment, the wagering game machine 1400 can exhibit any suitable form factor, such as a free standing model, bartop model, mobile handheld model, or workstation console model. Further, in some embodiments, the wagering game machine 1400 may be include an attached chair assembly, and may include audio speakers designed to provide an enhanced audio environment. For example, a "surround sound" system may be included as part of the wagering game machine and may be integrated with the attached chair.

A player begins playing a basic wagering game by making a wager via the value input device 1418. The player can initiate play by using the player input device's buttons or touch screen 1428. The basic game can include arranging a plurality of symbols along a payline 1432, which indicates one or more outcomes of the basic game. Such outcomes can be randomly selected in response to player input. At least one of the outcomes, which can include any variation or combination of symbols, can trigger a bonus game.

In some embodiments, the wagering game machine 1400 can also include an information reader 1452, which can include a card reader, ticket reader, bar code scanner, RFID transceiver, or computer readable storage medium interface. In some embodiments, the information reader 1452 can be used to award complimentary services, restore game assets, track player habits, etc.

Example Portable Wagering Game Machine

Figure 15:
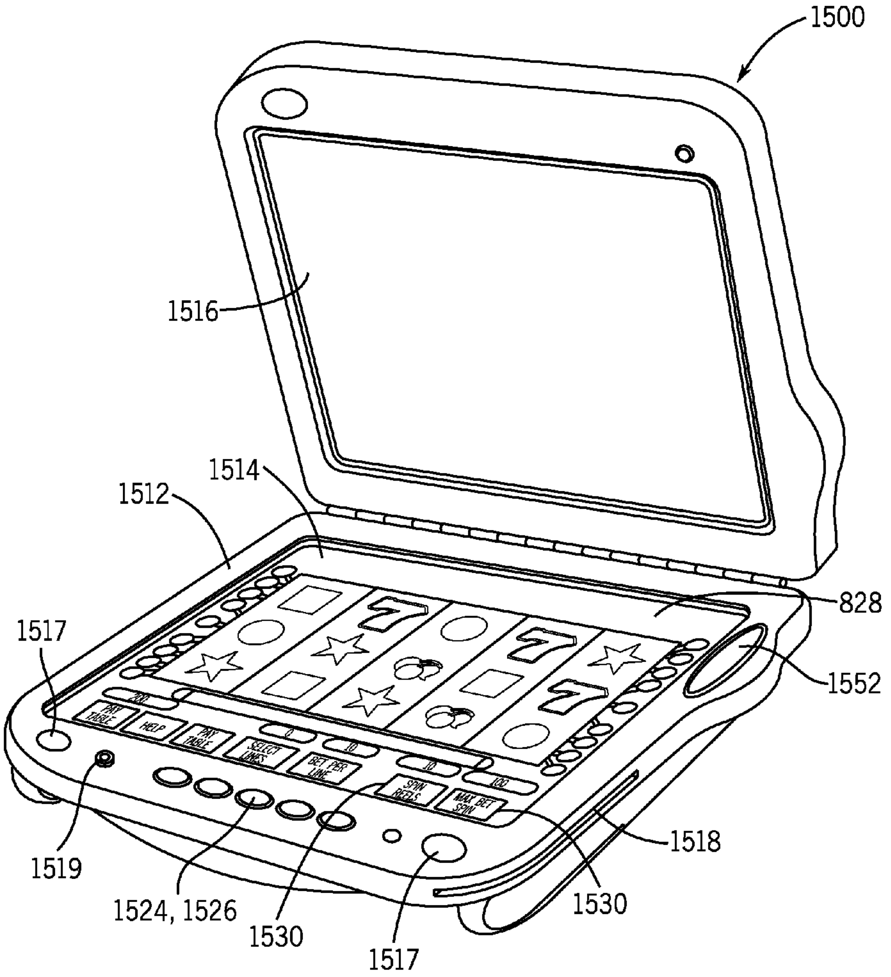
FIG. 15 is a perspective view of a portable wagering game machine according to an example embodiment.

FIG. 15 shows an example embodiment of a portable wagering game machine 1500. The portable wagering game machine 1500 can include any suitable electronic handheld or mobile device configured to play a video casino game such as blackjack, slots, keno, poker, blackjack, and roulette. The wagering game machine 1500 comprises a housing 1512 and includes input devices, including a value input device 1518 and a player input device 1524. For output, the wagering game machine 1500 includes a primary display 1514, and may include a secondary display 1516, one or more speakers 1517, one or more player-accessible ports 1519 (e.g., an audio output jack for headphones, a video headset jack, etc.), and other conventional I/O devices and ports, which may or may not be player-accessible. In the embodiment depicted in FIG. 15, the wagering game machine 1500 includes a secondary display 1516 that is rotatable relative to the primary display 1514. The optional secondary display 1516 can be fixed, movable, and/or detachable/attachable relative to the primary display 1514. Either the primary display 1514 and/or secondary display 1516 can be configured to display any aspect of a non-wagering game, wagering game, secondary game, bonus game, progressive wagering game, group game, shared-experience game or event, game event, game outcome, scrolling information, text messaging, emails, alerts or announcements, broadcast information, subscription information, and wagering game machine status.

The player-accessible value input device 1518 can comprise, for example, a slot located on the front, side, or top of the casing 1512 configured to receive credit from a stored-value card (e.g., casino card, smart card, debit card, credit card, etc.) inserted by a player. The player-accessible value input device 1518 can also comprise a sensor (e.g., an RF sensor) configured to sense a signal (e.g., an RF signal) output by a transmitter (e.g., an RF transmitter) carried by a player. The player-accessible value input device 1518 can also or alternatively include a ticket reader, or barcode scanner, for reading information stored on a credit ticket, a card, or other tangible portable credit or funds storage device. The credit ticket or card can also authorize access to a central account, which can transfer monetary value to the wagering game machine 1500.

Still other player-accessible value input devices 1518 can require the use of touch keys 1530 on the touch-screen display (e.g., primary display 1514 and/or secondary display 1516) or player input devices 1524. Upon entry of player identification information and, preferably, secondary authorization information (e.g., a password, PIN number, stored value card number, predefined key sequences, etc.), the player can be permitted to access a player's account. As one potential optional security feature, the wagering game machine 1500 can be configured to permit a player to only access an account the player has specifically set up for the wagering game machine 1500. Other conventional security features can also be utilized to, for example, prevent unauthorized access to a player's account, to minimize an impact of any unauthorized access to a player's account, or to prevent unauthorized access to any personal information or funds temporarily stored on the wagering game machine 1500.

The player-accessible value input device 1518 can itself comprise or utilize a biometric player information reader which permits the player to access available funds on a player's account, either alone or in combination with another of the aforementioned player-accessible value input devices 1518. In an embodiment wherein the player-accessible value input device 1518 comprises a biometric player information reader, transactions such as an input of value to the wagering game machine 1510, a transfer of value from one player account or source to an account associated with the wagering game machine 1500, or the execution of another transaction, for example, could all be authorized by a biometric reading, which could comprise a plurality of biometric readings, from the biometric device.

Alternatively, to enhance security, a transaction can be optionally enabled only by a two-step process in which a secondary source confirms the identity indicated by a primary source. For example, a player-accessible value input device 1518 comprising a biometric player information reader can require a confirmatory entry from another biometric player information reader 1552, or from another source, such as a credit card, debit card, player ID card, fob key, PIN number, password, hotel room key, etc. Thus, a transaction can be enabled by, for example, a combination of the personal identification input (e.g., biometric input) with a secret PIN number, or a combination of a biometric input with an authentication fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 1518 can be provided remotely from the wagering game machine 1510.

The player input device 1524 may include a plurality of push buttons on a button panel for operating the wagering game machine 1500. In addition, or alternatively, the player input device 1524 can comprise a touch screen mounted to the primary display 1514 and/or secondary display 1516. In one aspect, the touch screen is matched to a display screen having one or more selectable touch keys 1530 selectable by a user's touching of the associated area of the screen using a finger or a tool, such as a stylus pointer. A player enables a desired function either by touching the touch screen at an appropriate touch key 1530 or by pressing an appropriate push button on the button panel. The touch keys 1530 can be used to implement the same functions as push buttons. Alternatively, the push buttons 1526 can provide inputs for one aspect of the operating the game, while the touch keys 1530 can allow for input needed for another aspect of the game. The various components of the wagering game machine 1500 can be connected directly to, or contained within, the casing 1512, as seen in FIG. 15, or can be located outside the casing 1512 and connected to the casing 1512 via a variety of wired (tethered) or wireless connection methods. Thus, the wagering game machine 1500 can comprise a single unit or a plurality of interconnected (e.g., wireless connections) parts which can be arranged to suit a player's preferences.

The operation of the basic wagering game on the wagering game machine 1500 is displayed to the player on the primary display 1514. The primary display 1514 can also display a bonus game associated with the basic wagering game. The primary display 1514 preferably takes the form of a high resolution LCD, a plasma display, an LED, or any other type of display suitable for use in the wagering game machine 1500. The size of the primary display 1514 can vary from, for example, about a 2-3" display to a 15" or 17" display. In at least some embodiments, the primary display 1514 is a 7"-10" display. In one embodiment, the size of the primary display can be increased. Optionally, coatings or removable films or sheets can be applied to the display to provide desired characteristics (e.g., anti-scratch, anti-glare, bacterially-resistant and anti-microbial films, etc.). In at least some embodiments, the primary display 1514 and/or secondary display 1516 can have a 16:9 aspect ratio or other aspect ratio (e.g., 4:3). The primary display 1514 and/or secondary display 1516 can also each have different resolutions, different color schemes, and different aspect ratios.

A player typically begins play of the basic wagering game on the wagering game machine 1500 by making a wager (e.g., via the value input device 1518 or an assignment of credits stored on the portable wagering game machine 1500 via the touch screen keys 1530, player input device 1524, or buttons 1526) on the wagering game machine 1500. In some embodiments, the basic game can comprise a plurality of symbols arranged in an array, and includes at least one payline 1532 that indicates one or more outcomes of the basic game. Such outcomes can be randomly selected in response to the wagering input by the player. At least one of the plurality of randomly selected outcomes can be a start-bonus outcome, which can include any variations of symbols or symbol combinations triggering a bonus game.

In some embodiments, the player-accessible value input device 1518 of the wagering game machine 1500 can double as a player information reader 1552 that allows for identification of a player by reading a card with information indicating the player's identity (e.g., reading a player's credit card, player ID card, smart card, etc.). The player information reader 1552 can alternatively or also comprise a bar code scanner, RFID transceiver or computer readable storage medium interface. In one embodiment, the player information reader 1552 comprises a biometric sensing device.

In some embodiments, a portable wagering game machine 1500 can part of a portable wireless communication device, such as a personal digital assistant (PDA), a laptop or portable computer with wireless communication capability, a web tablet, a wireless telephone, a wireless headset, a pager, an instant messaging device, a digital camera, a television, or other device that can receive and/or transmit information wirelessly.

Conclusion

Systems and methods for presenting a wagering game in which a portion or elements of the wagering game are resized using seam carving have been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the inventive subject matter.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

The Abstract is provided to comply with 37 C.F.R. §1.72(b) to allow the reader to quickly ascertain the nature and gist of the technical disclosure. The Abstract is submitted with the understanding that it will not be used to limit the scope of the claims.

What is claimed is:

1. A computer-implemented method for adjusting game images of a wagering game, the method comprising:

displaying, as part of the wagering game and via at least one of one or more display devices, a graphical game image including a first sub-image having a first initial size and a second sub-image having a second initial size;

in direct response to a game event in the wagering game, modifying the game image, via at least one of one or more processors, to indicate the game event, the modifying including:

(i) analyzing graphical content of the game image by determining respective energy levels of the first and second sub-images, and (ii) resizing, in accordance with the respective energy levels, the first and second sub-images to a first final size and a second final size, respectively, wherein a difference between the first initial size and the first final size is dissimilar to a difference between the second initial size and the second final size; and displaying the modified game image including the resized first and second sub-images.

2. The method of claim 1, wherein the first sub-image includes a graphic object within the game image, the second sub-image includes at least a portion of the game image background.

3. The method of claim 1, wherein resizing the first and second sub-images includes at least one of adding and removing a horizontal or vertical seam from the game image.

4. The method of claim 1, wherein resizing the first and second sub-images comprises adding image data to the game image in accordance with the energy level.

5. The method of claim 4, wherein adding image data to the game image includes adding a horizontal or vertical seam to the game image.

6. The method of claim 1, wherein the game event includes one of an appearance of a particular symbol, a selection of a pickable object, and a start of an animation.

7. The method of claim 1, wherein the game event comprises displaying a second wagering game and wherein the first and second sub-images are resized such that the wagering game and the second wagering game may be displayed simultaneously within the game image.

8. The method of claim 1, wherein the game image includes a plurality of pickable objects, and wherein the game event includes removing a pickable item of the plurality, and wherein the first and second sub-images are resized such that the remaining one or more pickable items increase in size within the game image.

9. The method of claim 1, further comprising adjusting energy levels of one or more graphical objects in accordance with a relative importance of the one or more graphical objects to the game image.

10. The method of claim 9, wherein at least one of the one or more graphical objects is a pickable object and wherein the energy levels are adjusted such that the pickable object is resized at a different rate than other graphical elements in the game image.

11. The method of claim 9, wherein the relative importance of the one or more graphical objects is determined, at least in part, by key values indicating one or more or the graphical objects is a pickable object.

12. The method of claim 10, further comprising resizing a touch screen bounding box in accordance with the resized pickable object.

13. A computer-readable, non-transitory medium including executable instructions that, when executed by a gaming system, cause the gaming system to perform a method comprising:

displaying, via at least one of one or more display devices, a graphical game image as part of a wagering game, the game image including a first sub-image on a first layer and a second sub-image on a second layer, wherein the first sub-image is a first initial size and the second sub-image is a second initial size;

in direct response to a game event in the wagering game, modifying the game image, via at least one of one or more processors, to indicate the game event, the modifying including:

(i) flattening the first and second layers into a flattened image layer including both the first sub-image and the second sub-image, (ii) analyzing the graphical content of the flattened image layer, (iii) resizing, according to the analysis, the first and second sub-images to a first final size and a second final size, respectively, wherein a difference between the first initial size and the first final size is dissimilar to a difference between the second initial size and the second final size, and (iv) restoring the first and second layers with the resized first and second sub-images, respectively; and displaying the restored game image including the resized first and second sub-images.

14. The computer-readable medium of claim 13, wherein the first sub-image includes a graphic object within the game image, the second sub-image includes at least a portion of the game image background.

15. The computer-readable medium of claim 13, wherein analyzing the graphical content of the flattened image layer comprises determining respective energy levels for portions of the flattened image layer and wherein resizing the first and second sub-images comprises removing portions of the flattened image layer in accordance with the respective energy levels.

16. A gaming system configured to adjust game images of a wagering game, the gaming system comprising:

one or more display devices;

one or more processors; and one or more memory storage devices storing instructions that, when executed by at least of the one or more processors, cause the one or more processors to operate with the one or more display devices to:

display a graphical game image that is part of the wagering game, the game image including a first sub-image having a first initial size and a second sub-image having a second initial size;

in direct response to a game event in the wagering game, modify the game image to indicate the game event, the modifying including:

(i) analyzing graphical content of the game image by determining respective energy levels for portions of the game image, and (ii) resizing, based at least in part on the respective energy levels, the first and second sub-images to a first final size and a second final size, respectively, wherein a difference between the first initial size and the first final size is dissimilar to a difference between the second initial size and the second final size, the resizing including removing portions of the game image; and display the modified game image including the resized first and second sub-images.

17. The gaming system of claim 16, wherein the first sub-image includes a graphic object within the game image, the second sub-image includes at least a portion of the game image background, and wherein the first final size is larger than the first initial size and the second final size is smaller than the second initial size.

18. A computer-implemented method for adjusting game images of a wagering game, the method comprising:

displaying, as part of the wagering game and via at least one of one or more display devices, a graphical game image including a first sub-image having a first initial size and a second sub-image having a second initial size, wherein the game image includes a plurality of layers;

in direct response to a game event in the wagering game, modifying the game image, via at least one of one or more processors, to indicate the game event, the modifying including:

(i) analyzing graphical content of the game image, and (ii) resizing, according to the analysis, the first and second sub-images to a first final size and a second final size, respectively, wherein a difference between the first initial size and the first final size is dissimilar to a difference between the second initial size and the second final size, and wherein the game event is animated by resizing at least some of the plurality of layers at different rates with respect to each other; and displaying the modified game image including the resized first and second sub-images.

* * * * *